Feb. 28, 1956　　M. M. LEVY　　2,736,773
AUTOMATIC EXCHANGES
Filed Nov. 24, 1951　　18 Sheets-Sheet 4

INVENTOR
MAURICE MOISE LEVY
BY
ATTORNEY

Feb. 28, 1956  M. M. LEVY  2,736,773
AUTOMATIC EXCHANGES
Filed Nov. 24, 1951  18 Sheets-Sheet 5

INVENTOR
Maurice Moise Levy
BY
ATTORNEY

Feb. 28, 1956  M. M. LEVY  2,736,773
AUTOMATIC EXCHANGES
Filed Nov. 24, 1951  18 Sheets-Sheet 11

INVENTOR
Maurice Moise Levy
BY
ATTORNEY

Feb. 28, 1956 — M. M. LEVY — 2,736,773
AUTOMATIC EXCHANGES
Filed Nov. 24, 1951 — 18 Sheets-Sheet 12

INVENTOR
MAURICE MOISE LEVY
BY
ATTORNEY

Feb. 28, 1956

M. M. LEVY 2,736,773

AUTOMATIC EXCHANGES

Filed Nov. 24, 1951

INVENTOR
MAURICE MOISE LEVY

BY

ATTORNEY

Feb. 28, 1956 M. M. LEVY 2,736,773
AUTOMATIC EXCHANGES
Filed Nov. 24, 1951 18 Sheets-Sheet 14
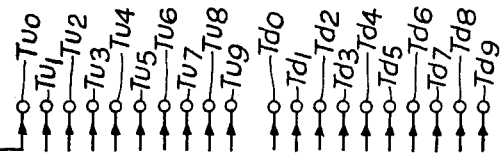
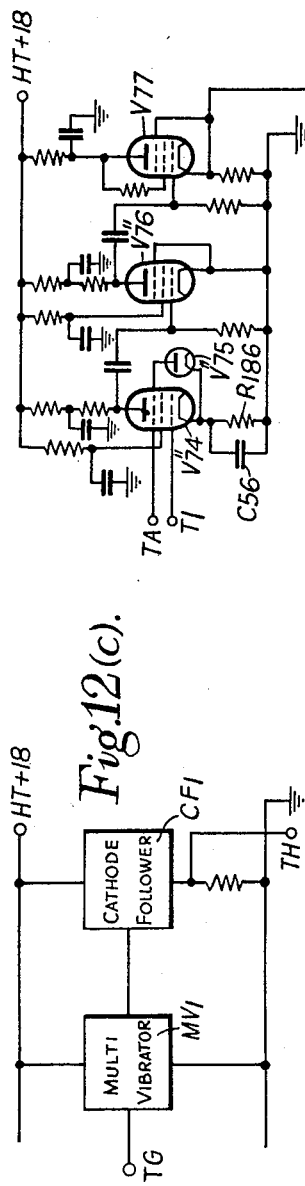
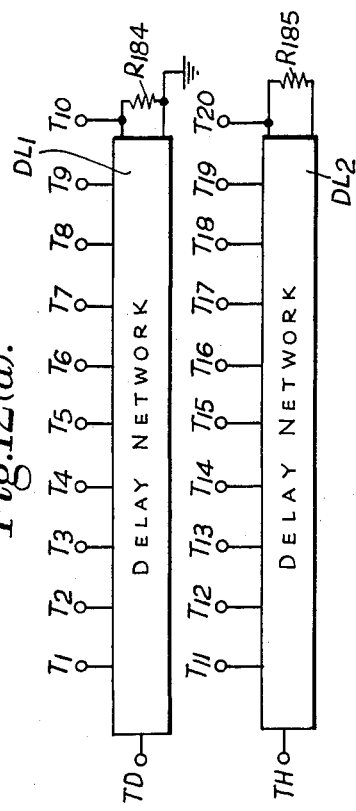
INVENTOR
MAURICE MOISE LEVY
BY
ATTORNEY Feb. 28, 1956         M. M. LEVY         2,736,773
                   AUTOMATIC EXCHANGES
Filed Nov. 24, 1951                    18 Sheets-Sheet 16

INVENTOR
MAURICE MOISE LEVY
BY
ATTORNEY

Feb. 28, 1956    M. M. LEVY    2,736,773
AUTOMATIC EXCHANGES

Filed Nov. 24, 1951    18 Sheets-Sheet 18

INVENTOR
Maurice Moise Levy
BY
ATTORNEY

United States Patent Office 2,736,773
Patented Feb. 28, 1956

1

2,736,773

AUTOMATIC EXCHANGES

Maurice Moise Levy, Ottawa, Ontario, Canada, assignor to The General Electric Company Limited, London, England Application November 24, 1951, Serial No. 257,992

5 Claims. (Cl. 179—18)

The present invention relates to automatic exchanges for use in telephony and the like.

In co-pending U. S. patent applications Serial Nos. 247,072, 257,786 and 257,991, filed, respectively, on September 18, 1951, November 23, 1951 and November 24, 1951, automatic telephone exchanges are described in which a group of communication channels is provided the number of channels being much less than the number of subscribers connected to the exchange. Calling apparatus responsive to an initial calling signal such as a D. C. signal transmitted when a telephone subscriber lifts a telephone handset prior to dialling the number of another subscriber, seizes a free one of the aforesaid communication channels. Means are provided whereby, in operation, further calling signals, such as dialling impulses, are then applied in the exchange to transmit to the terminal equipment of the called subscriber an identification signal identifying the selected one of the communication channels. Apparatus is provided to identify the channel indicated by the identification signal and to connect the called subscriber to the identified channel.

According to the present invention, an automatic exchange comprises a group of communication channels, the number of channels in the group being substantially less than the number of stations connected to the exchange, routing apparatus responsive to a calling signal from a first station connected to the exchange, and representative of the number of a second station, to transmit a calling signal to the terminal equipment of the second station, apparatus responsive to the calling signal applied to the said terminal equipment to seize a free one of the said channels, identification apparatus adapted to transmit to the terminal equipment of the first station a signal identifying the seized channel, and apparatus responsive to the channel identification signal transmitted to the terminal equipment of the first station to connect the last named terminal equipment to the identified channel, whereby communication between the first and second stations can be established in the identified channel.

The routing apparatus may comprise a register and a router as described in co-pending patent application No. 247,072. Alternatively a register and a group of low grade communication channels as described in co-pending U. S. patent applications Nos. 257,786 and 257,991 may be used for this purpose.

The "apparatus responsive to the calling signal to seize a free one of the said channels" may be any suitable device such as a line finder, or an arrangement as described in copending U. S. patent application No. 190,533.

The said identification apparatus may be a router as described in co-pending U. S. patent application No. 247,233 or return channels in the aforesaid group of low grade channels. The identification signal may be a pulse or a coded group of pulses.

The said aparatus responsive to the channel identification signal may be as described in co-pending U. S.

2 patent application No. 190,533 or in co-pending U. S. patent application No. 257,786.

The invention will now be described, by way of example, with reference to the accompanying drawings in which:

Figures 2 to 12e are diagrams of parts shown in block form in Figure 1, and

Figure 1:
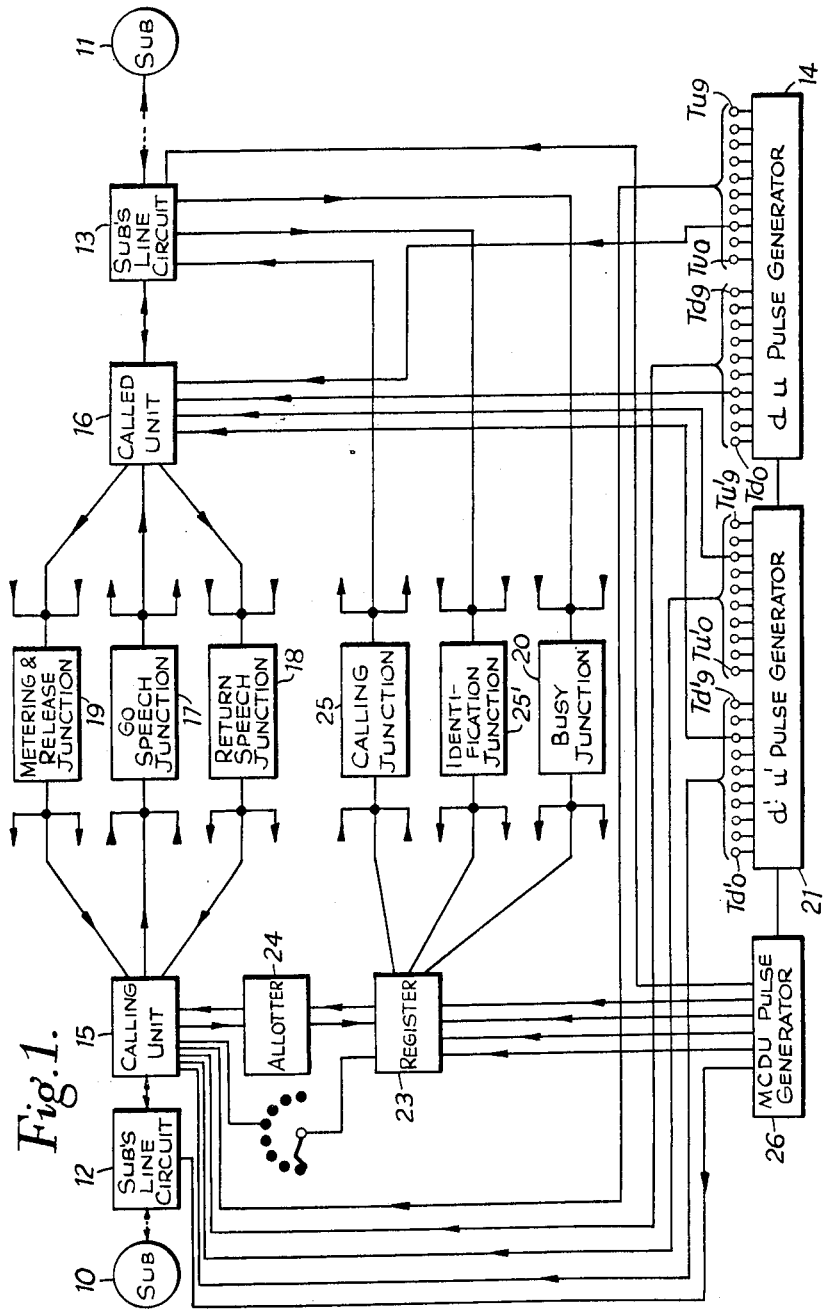
Figure 1 is a block schematic diagram of one embodiment of the invention.

Referring to Figure 1 this is a block schematic diagram of an automatic exchange suitable for use with 2,000 subscribers. Of the 2,000 subscribers' stations connected to the exchange, one is shown at 10 and another at 11, the station 10 being terminated in the exchange at "sub's line circuit" 12 and the station 11 being terminated at the "sub's line circuit" 13. The "sub's line circuits" will be described later.

The exchange comprises a group of 100 high grade pulse communication channels. This group of channels is provided by means including a pulse generator 14 adapted to generate pulses suitable for combination to provide the 100 channels time-interlaced at a pulse repetition frequency of 8,000 pulses per second in each channel. The 100 channels are terminated by 100 "called units" respectively of which one is shown at 16. 100 "calling units" terminate the other ends of the channels respectively when in use, one of the called units being shown at 15. The calling and called units will be described later. Signals between the calling and called units pass through a "Go speech junction" 17, a "Return speech junction" 18 or a "Metering and release junction" 19 as the case may be. In the event of a called subscriber being engaged, a "busy signal" is transmitted to the calling subscriber by way of a "busy junction" 20 as will be described later.

For use in establishing calls between subscribers a number of allotters 24 and registers 23 are provided together with a calling junction 25, an identification junction 25' and two further pulse generators 21 and 26, examples of which will be described later.

Assuming the subscriber at station 10 to be calling the subscriber at station 11, the first operation occurs in the sub's line circuit 12. This contains a finder which finds a free calling unit 15. An allotter 24 then comes into operation and allots a register 23 to the calling unit 15.

By means of the allotter and a finder in the register the calling unit found by the sub's line circuit 12 is connected to the allotted register 23 as will be described later. A dialling tone is then automatically transmitted to the calling subscriber.

When the calling subscriber hears the dialling tone and dials the number of the called subscriber, the dialling pulses are transmitted through the line circuit 12, and the seized calling unit 15 to the allotted register 23. In the register the four sets of dialling pulses are stored on four uniselectors as will be described later. Four groups of ten pulses each, which will be referred to as the M, C, D and U pulses, are applied to the four uniselectors in the register from the pulse generator 26. Thus the uniselectors in the register select one pulse from each of the four groups of recurring pulses applied thereto and it is arranged that these four four selected pulses are combined to form a recurring output pulse which occurs in one recurring channel interval in a recurring sequence of 2,000 channel intervals. The sequence may recur for example at the rate of one per second and the 2,000 channels constitute a group of low grade communication channels.

The recurring output pulse from the register is applied through the calling junction to all subscriber's line circuits. These circuits have gating pulses applied thereto, however, from the pulse generator 26, the gating pulses applied to each subscriber's line circuit being in the channel whose number corresponds to the subscriber's number on the exchange. Thus the only subscriber's line circuit to respond to a calling appearing at the output of the calling junction is that one whose gating pulse corresponds to the number dialled.

The called subscriber's line circuit then hunts for a free called unit.

Each called unit is connected to one of the terminals $Td'_0$ to $Td'_9$ and to one of the terminals $Tu'_0$ to $Tu'_9$ of the generator 21 different ones of the called units being connected to different pairs of the terminals $Td'$ and $Tu'$. The output of the generator 21 is in the form of a recurring sequence of twenty pulses which, for convenience, will be divided into two groups. The first ten pulses in the sequence will be referred to collectively as the $d'$ pulses and the second ten as the $u'$ pulses. The ten $d'$ pulses will be referred to individually as pulses $d'_0$ to $d'_9$ respectively and appear at the terminals $Td'_0$ to $Td_9$ respectively of the generator 21. The ten $u'$ pulses will be referred to individually as pulses $u'_0$ to $u'_9$ respectively and appear at the terminals $Tu'_0$ to $Tu'_9$ respectively of the generator 21. Thus each called unit is identified by a different pair of $d'$ and $u'$ pulses.

When a free called unit is found by the called subscriber's line circuit, the $d'$ and $u'$ pulses identifying the called unit are transmitted through the identification junction 25' and the register 23 to the calling unit seized by the calling subscriber.

The calling unit, in response to these $d'$ and $u'$ pulses selects appropriate pulses from the output of the generator 14 to enable communication to be established between the two subscribers in the channel terminated by the called unit seized by the called subscriber's line circuit.

The automatic exchange shown in Figure 1 will now be described in more detail with reference to Figures 2 to 17. Throughout Figures 2 to 17 all relays and automatic switches are shown in conventional manner the operating windings thereof being referenced with a letter over a figure, the figure indicating the number of relay contacts or banks of switch contacts associated with the winding. The contacts or banks of contacts associated with a winding are given the same letter reference followed by figure, references to different contacts or banks of contacts containing different figures. A contact may also have the same reference letter as its operating winding followed by a further letter or letters. All relays and switches are shown in their unoperated positions.

Figure 2:
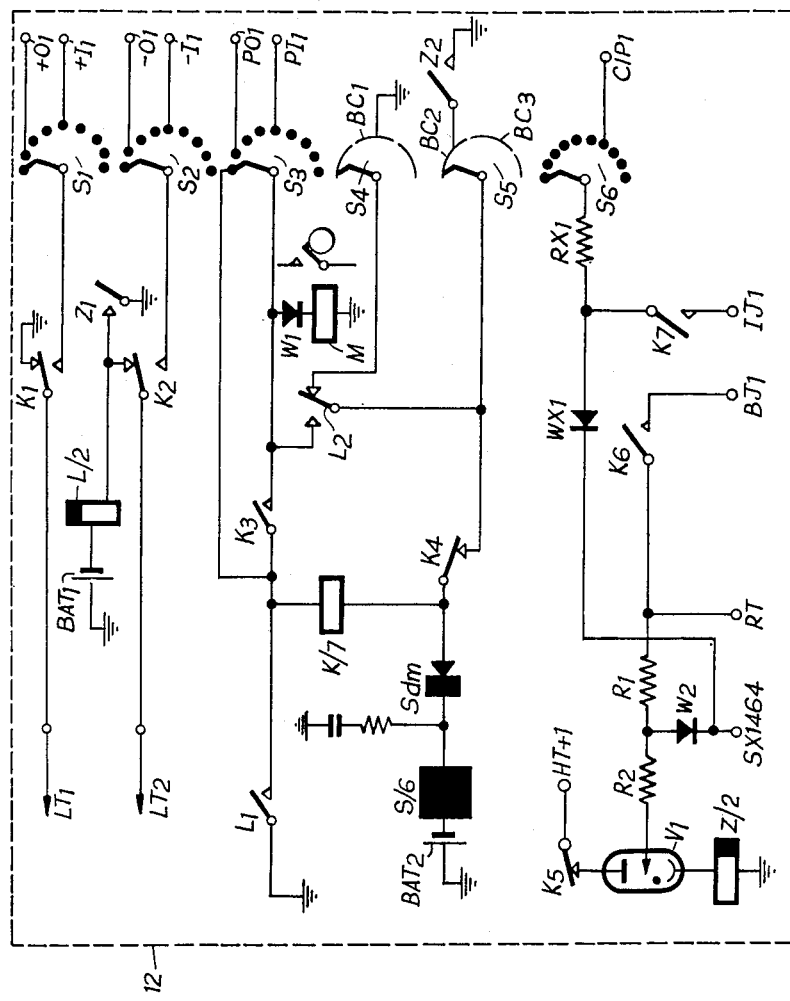

Referring to Figure 2 this is a circuit diagram of apparatus suitable for use as the sub's line circuits 12 and 13 of Figure 1. The subscriber's line is connected to line terminals $LT_1$ and $LT_2$, $LT_1$ being normally connected to earth through relay contacts K1 and $LT_2$ being normally connected through relay contacts K2, relay winding L and battery $BAT_1$ to earth. A uni-selector having six banks of contacts S1 to S6 is operated by a winding S and interruptor $Sdm$. The automatic interrupter operation may be as described on page 225 of Telephony volume 2 by J. Atkinson, published by Sir Isaac Pitman & Sons, Ltd. 1950. This work by Atkinson will be hereinafter referred to as Telephony (either vol. I or II) by Atkinson. Each of the banks S1, S2 and S3 has 25 fixed contacts, a first of the contacts being the "home" contact, the next 12 being OUT contacts, and the other 12 being IN contacts.

The banks S1 and S2 are for carrying speech, the wipers thereof being connected to $LT_1$ and $LT_2$ respectively, when the apparatus is in use, by relay contacts K1 and K2. Contacts 2 to 13 of S1 are connected to 12 output terminals respectively of which one is shown at $+O_1$ and contacts 14 to 25 are connected to 12 input terminals respectively of which one is shown at $+I_1$. Contacts 2 to 13 of S2 are connected to 12 output terminals of which one is shown at $-O_1$, and contacts 14 to 25 are connected to 12 input terminals of which one is shown at $-I_1$. The bank S3 is used for control purposes, contacts 2 to 13 being connected to 12 output terminals respectively of which one is shown at $PO_1$, and contacts 14 to 25 being connected to 12 input terminals of which one is shown at $PI_1$.

Bank S4 has an insulated home contact and a homing arc $BC_1$. The function of the homing arc is as described on pages 259 and 260 of Telephony vol. II by Atkinson.

Bank S5 has an insulated home contact, an arcuate contact $BC_2$ extending over the equivalent of contacts 2 to 13 on S1, S2 and S3, and a further arcuate contact $BC_3$ extending over the equivalent of contacts 14 to 25 on S1, S2 and S3. Contact $BC_2$ is connected through relay contacts Z2 to earth.

Bank S6 has an insulated home contact, and 24 bank contacts of which contacts 14 to 25 are connected to 12 terminals respectively of which one is shown at $CIF_1$.

The home contact on S3 is connected through relay contacts L1 to earth. The wiper of S3 is connected through contacts K3 and L1 to earth, through contacts L2, and K4 to contacts $Sdm$; and through a rectifier $W_1$ and meter winding M to earth.

The wiper of $S^4$ is connected through contacts L2 to contacts K4 and to the wiper of S5.

The wiper of S6 is connected through a resistor $RX_1$ and relay contacts K7 to a terminal $IJ_1$ and through the resistor $RX_1$ and a rectifier $WX_1$ to a terminal $SX_{1464}$. A terminal RT is connected through relay contacts K6 to an output terminal $BJ_1$ and through resistors $R_1$ and $R_2$ in series to the control grid of a gas-filled triode valve $V_1$. The input terminal $SX_{1464}$ is also connected through a rectifier $W_2$ to the junction of resistors $R_1$ and $R_2$. The cathode lead of the valve $V_1$ has in series therewith a relay winding Z and the anode of the valve $V_1$ is connected through relay contacts K5 to the terminal $HT+l$ of a source (not shown), of D. C. whose negative terminal is earthed. A relay winding K is connected between contacts $Sdm$ and L1.

Figure 3A:
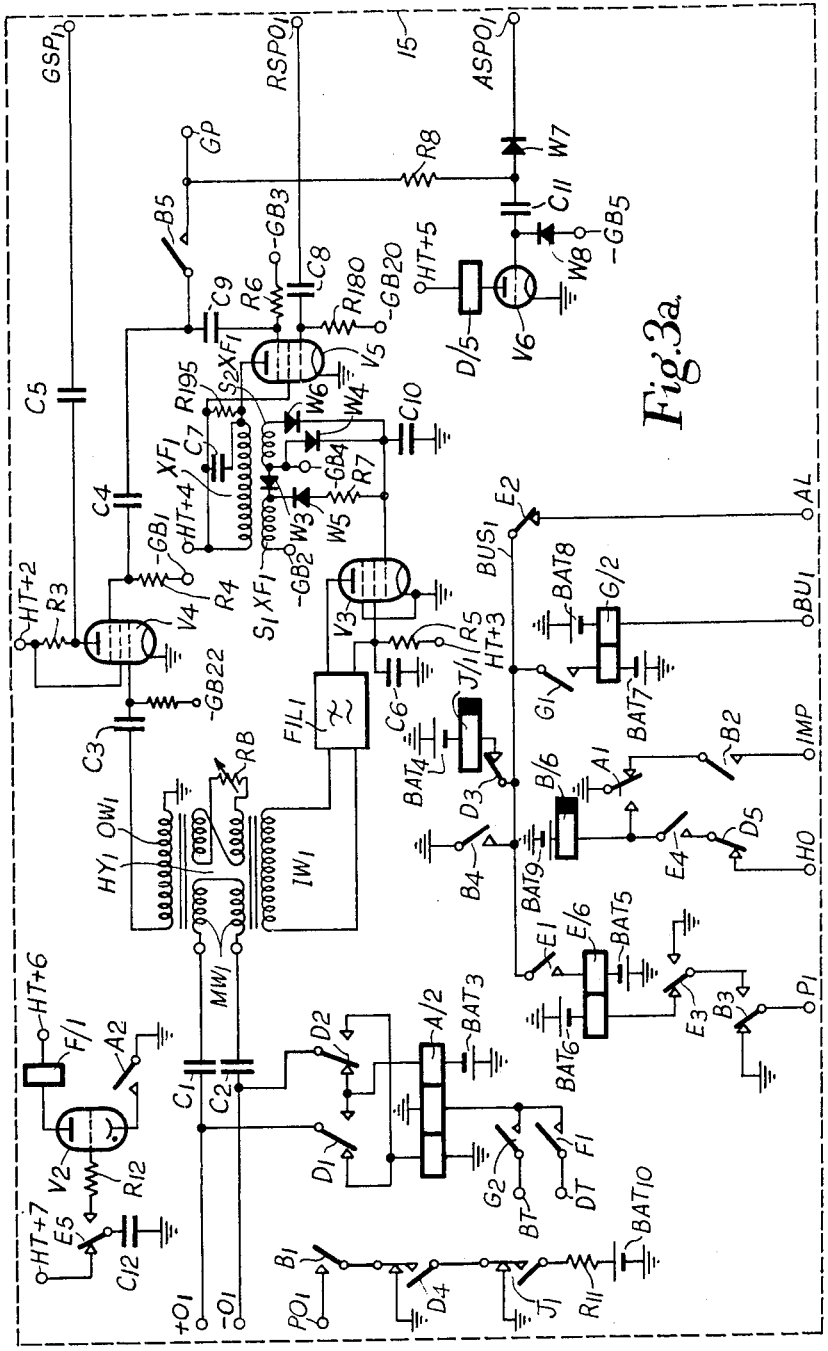

Referring now to Figures 3(a) and (b), these show a circuit diagram of apparatus suitable for use as the calling unit 15 of Figure 1. It will be assumed that this calling unit is that connected to terminals $+O_1$, $-O_1$, and $PO_1$ of Figure 2, these terminals also being shown in Figure 3(a). Terminal $+O_1$ is connected through relay contacts D1 and one winding of relay A to earth. Terminal $-O_1$ is connected through relay contacts D2, a second winding of relay A and a battery $BAT_3$ to earth. Terminals $+O_1$ and $-O_1$ are also connected through capacitors $C_1$ and $C_2$ respectively to a winding $MW_1$ of a hybrid transformer $HY_1$ which has a balancing resistor RB. The function of the hybrid transformer and balancing resistor is as described on page 83 vol. I of Telephony by Atkinson.

The winding $OW_1$ of the hybrid transformer is connected through a capacitor $C_3$ to the control grid of a pentode valve $V_4$ whose anode is connected through a load resistor $R_3$ to the positive terminal $HT+2$ of a source (not shown) of D. C. whose negative terminal is earthed. The cathode of the valve $V_4$ is earthed, the screen grid is connected directly to the terminal $HT+2$, and the suppressor grid is connected through a resistor $R_4$ to the negative terminal $-GB_1$ of a bias source (not shown) whose positive terminal is earthed. The suppressor grid is also connected through a capacitor $C_4$ and relay contacts B5 to a terminal GP. The anode of the valve $V_4$ is connected through a capacitor $C_5$ to a terminal $GSP_1$.

Winding $IW_1$ of the hybrid transformer $HY_1$ is connected to the output of a low-pass filter FIL1. One input terminal of the filter is connected to the anode of a pentode valve $V_3$ and the other to earth through a capacitor $C_6$ and through a resistor $R_5$ to the positive terminal $HT+3$ of a source of D. C. (not shown). The suppressor grid and cathode of the valve $V_3$ are connected to earth.

A terminal $RSPO_1$ is connected through a capacitor $C_8$ to the control grid of a pentode valve $V_5$ whose cathode is earthed. Negative bias is applied to the control grid of the valve $V_5$ from the negative terminal $-GB_{20}$ of a bias source (not shown) whose positive terminal is earthed. The anode of the valve $V_5$ is connected through the primary winding of a transformer $XF_1$ to the positive terminal $HT+4$ of a source (not shown) of D. C. whose negative terminal is earthed. The screen grid of the valve $V_5$ is connected directly to the terminal $HT+4$ and the suppressor grid is connected through a resistor $R_6$ to the negative terminal $-GB_3$ of a bias source (not shown) whose positive terminal is earthed. The suppressor grid of the valve $V_5$ is also connected through a capacitor $C_9$ and the contacts $B_5$ to the terminal GP.

The transformer $XF_1$ has two secondary windings $S_1XF_1$ and $S_2XF_1$. One terminal of winding $S_1XF_1$ is connected to the negative terminal $-GB_2$ of the bias source (not shown) and the other terminal is connected through a rectifier $W_5$, and a resistor $R_7$ to the control grid of the pentode valve $V_3$ and is connected through a rectifier $W_3$ to the negative terminal $-GB_4$ of a bias source (not shown) whose positive terminal is earthed. One terminal of the winding $S_2XF_1$ is connected to the negative terminal $-GB_4$ and the other terminal of the winding $S_2XF_1$ is connected through a rectifier $W_6$ to the control grid of the valve $V_3$. The terminal $-GB_4$ is also connected to the control grid of $V_3$ through a rectifier $W_4$ and a capacitor $C_{10}$ is connected between the control grid of $V_3$ and earth.

A terminal $ASPO_1$ is connected through a rectifier $V_6$ and capacitor $C_{11}$ to the control grid of a triode valve $W_6$ whose cathode is earthed and whose anode is connected through a relay winding D to the positive terminal $HT+5$ of a D. C. source (not shown) whose negative terminal is earthed. The control grid of the valve $V_6$ is also connected through a rectifier $W_8$ to the negative terminal $-GB_5$ of a bias source (not shown) whose positive terminal is earthed. The junction of the capacitor $C_{11}$ and the rectifier $W_7$ is connected to the terminal GP through a resistor $R_8$.

A relay winding J has one terminal connected to earth through a battery $BAT_4$. The other terminal of the relay winding J is connected to earth through relay contacts D3, a busbar $BUS_1$ and relay contacts B4. The busbar is connected through relay contacts E1, one winding of relay E and a battery $BAT_5$ to earth. A control terminal $P_1$ is connected either directly to earth or through the other winding of relay E and a battery $BAT_6$ to earth depending upon the setting of relay contacts B3 and E3. The busbar $BUS_1$ is connected through relay contacts G1, one winding of a relay G and a battery $BAT_7$ to earth. The other winding of the relay G has one terminal connected to earth through a battery $BAT_8$, and has its other terminal connected directly to a terminal $BU_1$. The busbar is also connected through relay contacts E2 to an output terminal AL.

Terminal HO is connected through relay contacts D5, E4 and A1 to earth. A relay winding B has one terminal connected through contacts A1 to earth and the other through a battery $BAT_9$ to earth. An output terminal IMP is connected through relay contacts B2 and A1 to earth.

Terminal $PO_1$ is connected through relay contacts B1 to relay contacts D4 which, depending upon their setting, provide either a earth connection or a connection to relay contacts J1. The relay contacts J1 provide either an earth connection or a connection through a resistor $R_{11}$ and a battery $BAT_{10}$ to earth.

The cathode of a gas-filled triode valve $V_2$ is connected to earth through relay contacts A2 and its anode is connected through a relay winding F to the positive terminal $HT+6$ of a suitable source (not shown) of D. C. whose negative terminal is earthed. A capacitor $C_{12}$ is normally connected to the positive terminal $HT+7$ of a source (not shown) of D. C. whose negative terminal is earthed. The control grid of the valve $V_2$ is connected to the capacitor $C_{12}$ through a resistor $R_{12}$ and the contacts E5.

A source (not shown) of busy tone is connected to the terminal BT which is connected to the centre winding of the relay A through relay contacts G2.

A source (not shown) of dialling tone is connected to the terminal DT which is connected through relay contacts F1 to the centre winding of the relay A.

Figure 3B:
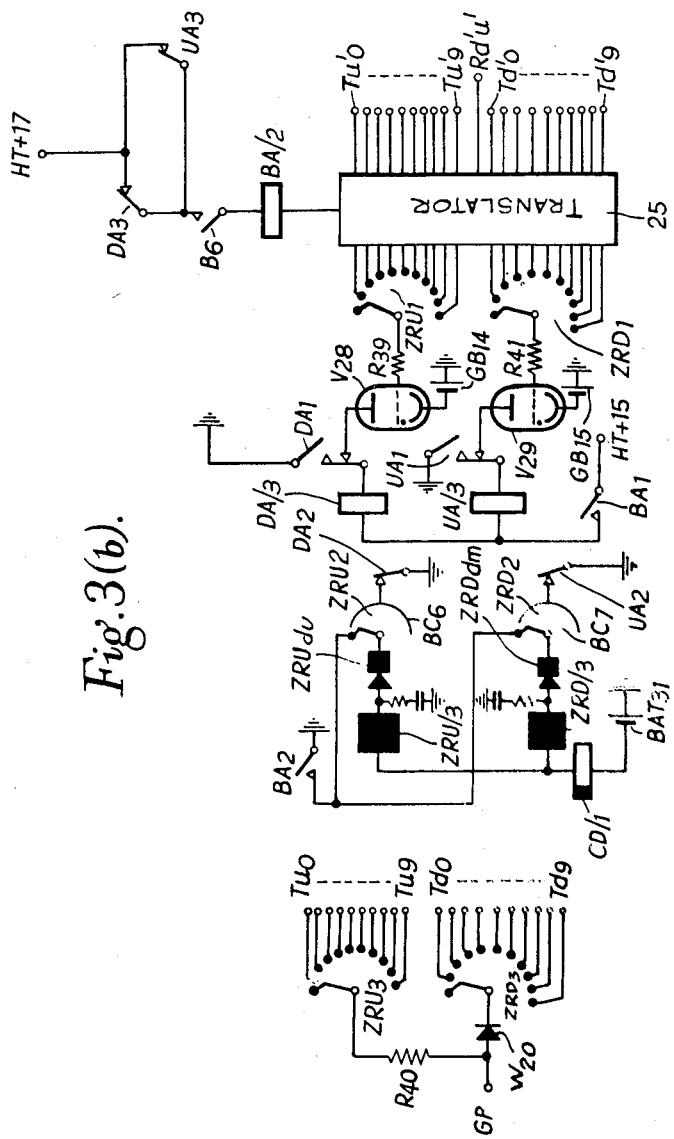

In Figure 3(b) the terminal GP corresponds to the terminal GP in Figure 3(a).

A uniselector ZRU has three banks ZRU1, ZRU2 and ZRU3, each of which has a home contact and bank contacts. The bank ZRU1 has ten bank contacts which are connected to the translator 25 to be described later. The wiper of the bank ZRU1 is connected through a resistor $R_{39}$ to the control grid of a gas-filled triode valve $V_{28}$. The cathode of the valve $V_{28}$ is connected to the negative terminal of a bias source $GB_{14}$ whose positive terminal is earthed. The anode of the valve $V_{28}$ is connected through relay contacts DA1 to one terminal of a relay winding DA. The other terminal of the winding DA is connected through relay contacts BA1 to the positive terminal $HT+15$ of a source (not shown) of D. C. whose negative terminal is earthed.

The bank ZRU2 is a homing bank and has its homing are $BC_6$ connected to earth through relay contacts DA2. The wiper of the bank ZRU2 is connected through contacts ZRUdu, operating winding ZRU, a relay winding CD and a battery $BAT_{31}$ in series to earth. The home contact of the bank ZRU2 is connected through relay contacts BA2 to earth.

The bank ZRU3 has ten bank contacts which are connected to ten terminals $Tu_0$ to $Tu_9$ respectively. The wiper of the bank ZRU3 is connected through a resistor $R_{40}$ to the terminal GP.

A uniselector ZRD has three banks ZRD1, ZRD2 and ZRD3, each of which has a home contact and bank contacts. The bank ZRD1 has ten bank contacts which are connected to the translator 25. The wiper of ZRD1 is connected through a resistor $R_{41}$ to the control grid of a gas-filled triode $V_{29}$ whose cathode is connected to earth through a bias source $GB_{15}$. The anode of the valve $V_{29}$ is connected through relay contacts UA1 to one terminal of a relay winding UA one other terminal of the winding UA is connected through the relay contacts BA1 to the terminal $HT+15$.

The bank ZRD2 is a homing bank and the homing arc $BC_7$ is connected through relay contacts UA2 to earth, and the home contact through relay contacts BA2 to earth. The wiper of the bank ZRD2 is connected through the mechanically operated contact ZRDdm, the operating winding ZRD, the relay winding CD and the battery $BAT_{31}$ in series to earth.

The bank ZRD3 has ten bank contacts which are connected to ten terminals $Td_0$ to $Td_9$ respectively. The wiper of the bank ZRD3 is connected through a rectifier $W_{20}$ to the terminal GP.

The translator 25 is connected through relay winding BA, and contacts B6, DA3 and UA3 to the positive terminal $HT+17$ of a source (not shown) of D. C. whose negative terminal is earthed. Ten terminals $Tu'_0$ to $Tu'_9$ and ten terminals $Td'_0$ to $Td'_9$ are connected to the translator, and a further terminal $Rd'u'$ is connected to the translator.

Figure 9:
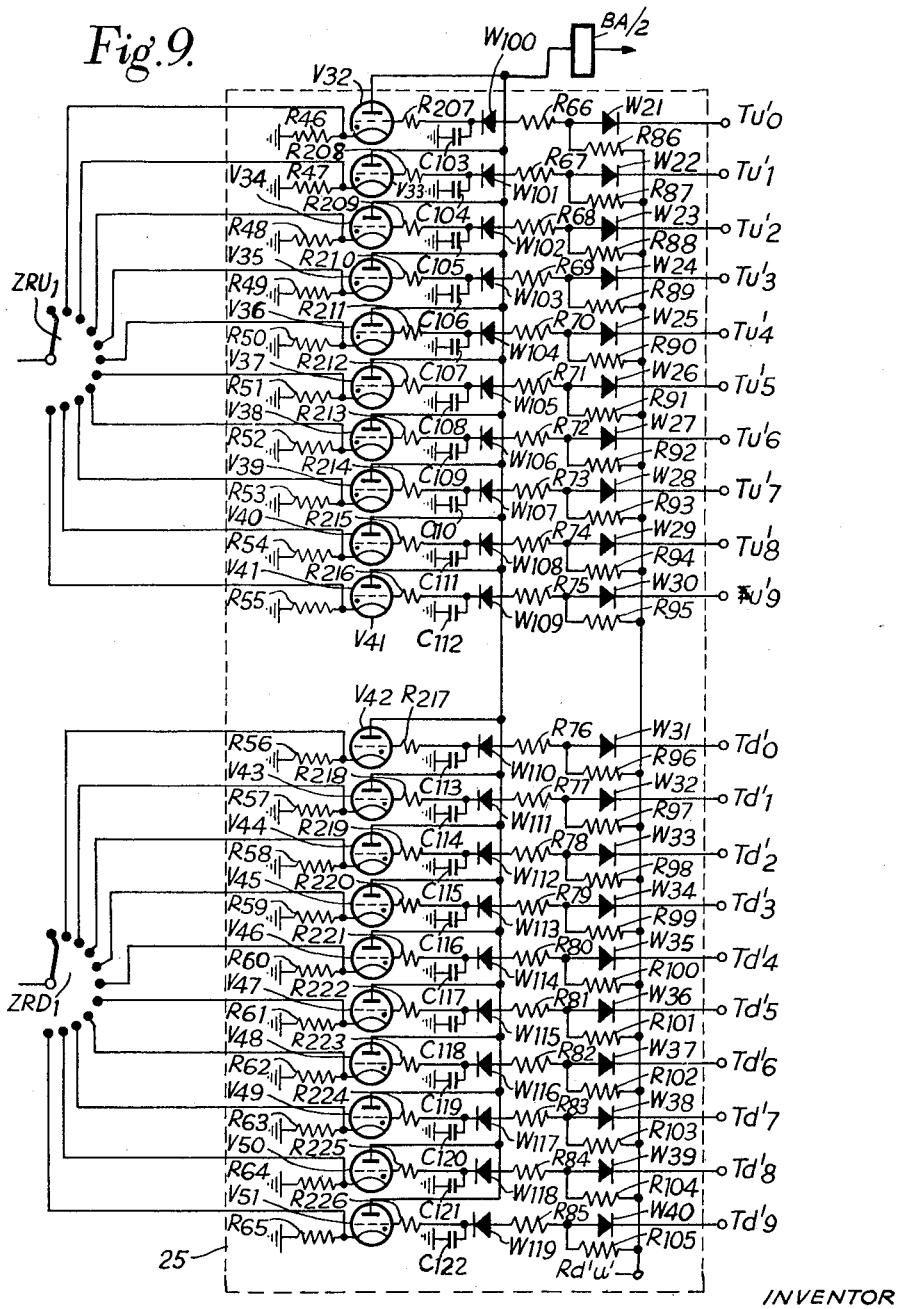

Referring now to Figure 9, this is a theoretical circuit diagram of the translator 25. The translator comprises two groups of gas-filled triode valves each group containing ten valves. A first of the groups contains ten triodes $V_{32}$ to $V_{41}$ whose cathodes are connected to earth through resistors $R_{46}$ to $R_{55}$ respectively, and directly to the ten bank contacts respectively of the uniselector bank $ZRU_1$. The anodes of the triodes $V_{32}$ to $V_{41}$ are connected together and to the relay winding BA of Figure 3(b).

The terminals $Tu'_0$ to $Tu'_9$ are connected through ten rectifiers $W_{21}$ to $W_{30}$ ten resistors $R_{66}$ to $R_{75}$ and ten rectifiers $W_{100}$ to $W_{109}$ respectively in series to the control grids of the triodes $V_{32}$ to $V_{41}$. The terminal $Rd'u'$ is connected through ten resistors $R_{86}$ to $R_{95}$ to the junctions of the rectifiers and resistors connecting the terminals $Tu'_0$ to $Tu'_9$ respectively to the control grids of the triodes $V_{32}$ to $V_{41}$. The control grids of the triodes $V_{32}$ to $V_{41}$ are connected through capacitors $C_{103}$ to $C_{112}$ and resistors $R_{207}$ to $R_{216}$ respectively to earth.

The second group contains ten triodes $V_{42}$ to $V_{51}$ whose cathodes are earthed through resistors $R_{56}$ to $R_{65}$ respectively. The cathodes of these valves are also connected directly to the ten bank contacts respectively of the uniselector bank ZRD1. The anodes of the valves $V_{42}$ to $V_{51}$ are connected together and to the relay winding BA. The terminals $Td'_0$ to $Td'_9$ are connected through ten rectifiers $W_{31}$ to $W_{40}$ ten resistors $R_{76}$ to $R_{85}$ and ten rectifiers $W_{110}$ to $W_{119}$ respectively in series to the control grids of the valves $V_{42}$ to $V_{51}$. The terminal $Rd'u'$ is connected through ten resistors $R_{96}$ to $R_{105}$ to the junctions of the rectifiers $W_{31}$ to $W_{40}$ and resistors $R_{76}$ to $R_{85}$ respectively.

Figure 4:
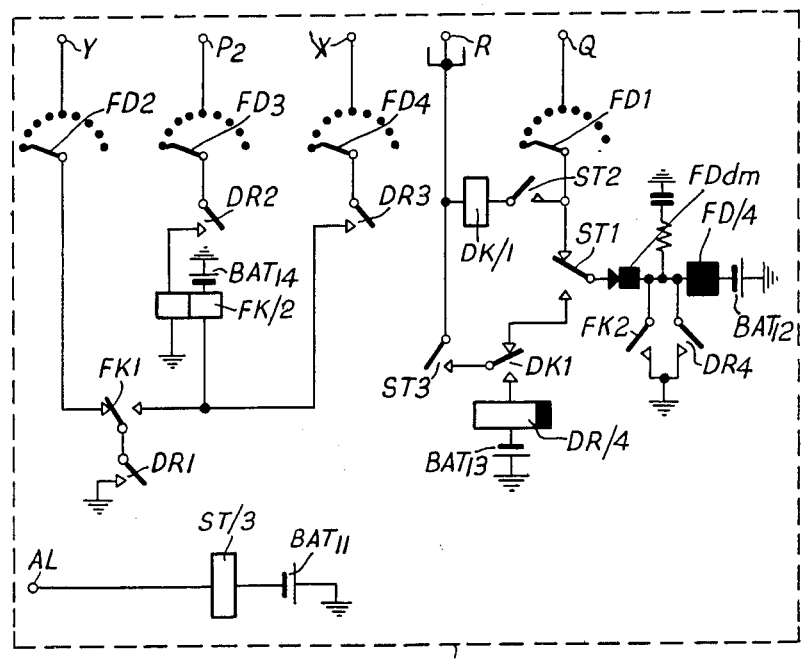

Referring now to Figure 4, this is a circuit diagram of an allotter suitable for use at 24 in Figure 1. The terminal AL corresponds to the terminal AL of Figure 3 and is connected through a relay winding ST and a battery $BAT_{11}$ to earth. A uniselector FD has four banks of contacts FD1, FD2, FD3 and FD4 whose wipers are controlled by automatic stopping apparatus including winding FD and contacts FDdm. The wiper of the bank FD1 is connected through relay contacts ST1, the contacts FDdm the winding FD and a battery $BAT_{12}$ to earth. The junction of the contacts FDdm and the winding FD is connected to earth through relay contacts FK2 and DR4. The fixed contacts of the bank FD1 are connected to output terminals respectively of which one is shown at Q. A terminal R is connected through a relay winding DK and relay contacts ST2 to the moving contact of the bank FD1. The terminal R is also connected through contacts ST3, and DK1 to contacts ST1. The contacts DK1 are also connected through relay winding DR and a battery $BAT_{13}$ to earth.

The bank contacts of the bank FD4 are connected to output terminals respectively of which one is shown at X. The wiper of the bank FD4 is connected through relay contacts DR3, FK1, and DR1 to earth.

The fixed contacts of the bank FD3 are connected to output terminals respectively of which one is shown at $P_2$. The wiper of the bank FD3 is connected through relay contacts DR2 and one winding of relay FK to earth. One terminal of the other winding of the relay FK is connected through the contacts FK1 and DR1 to earth, and the other terminal thereof is connected through a battery $BAT_{14}$ to earth.

The bank contacts of the bank FD2 are connected to output terminals respectively of which one is shown at Y. The wiper of FD2 is connected through the contacts FK1 and DR1 to earth.

Figure 5:
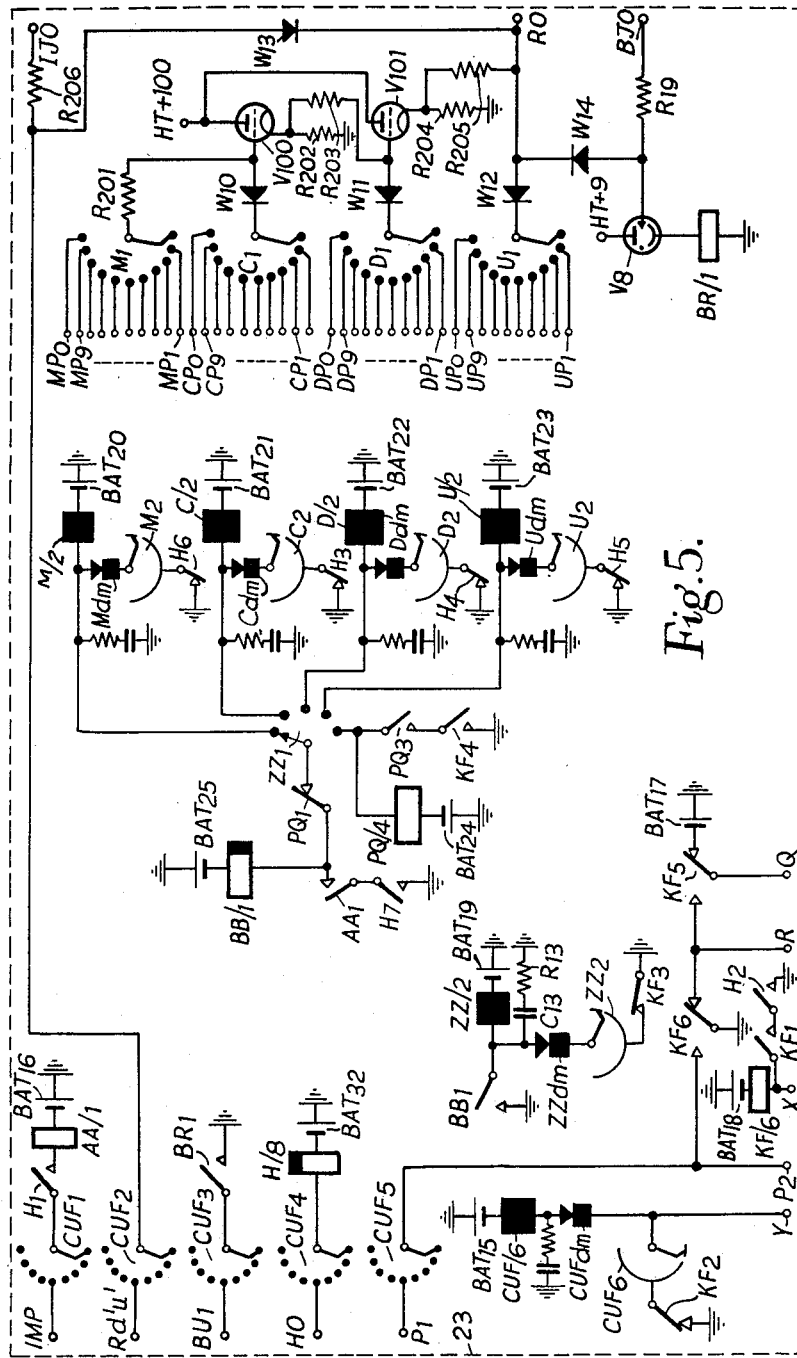

Referring now to Figure 5, this is a theoretical circuit diagram of a suitable register and calling unit finder for use in the arrangement of Figure 1. The terminals IMP, $Rd^1u^1$, $BU_1$, HO, and $P_1$ correspond to the terminals of the same reference in Figure 3, and terminals Y, $P_2$, X, R and Q correspond to those of the same reference in Figure 4.

The calling unit finder section of the arrangement shown in Figure 5 comprises a uni-selector CUF having six banks CUF1 to CUF6, whose wipers are driven by an automatic stepping circuit including a battery $BAT_{15}$ connected between earth and one terminal of winding CUF, and contacts CUFdm connected between the other terminal of the winding CUF and the terminal Y. The IMP terminals of several calling units (15 Figure 1) are connected to the bank contacts respectively of the bank CUF1 whose wiper is connected through relay contacts H1, a relay winding AA and a battery $BAT_{16}$ to earth. The terminals $Rd^1u^1$ of the several calling units are connected to the bank contacts of CUF2 respectively whose wiper is connected through a rectifier $W_{13}$ to a terminal RO and through a resistor $R_{206}$ to a terminal IJO. The $BU_1$ terminals of the several calling units are connected to the bank contacts respectively of CUF3 whose wiper is connected through relay contacts BR1 to earth. The HO terminals of the several calling units are connected to the bank contacts respectively of CUF4 whose wiper is connected through a relay winding H and a battery $BAT_{32}$ to earth. The $P_1$ terminals of the several calling units are connected to the bank contacts respectively of CUF5 whose wiper is connected to terminal $P_2$. The bank CUF6 is a homing bank. Each of the banks CUF1 to CUF6 has an insulated home contact.

The terminal $P_2$ is also connected through relay contacts KF6 to earth. The terminal R is connected through relay contacts KF6 to earth and through relay contacts KF5 to terminal Q which is also connected through contacts K5 and a battery $BAT_{17}$ to earth. The terminal X is connected through a relay winding KF and battery $BAT_{18}$ to earth, and through relay contacts KF1 and H2 to earth.

A uni-selector ZZ has two banks ZZ1 and ZZ2 whose wipers are driven by an automatic stopping circuit including winding ZZ and contacts ZZdm. The winding ZZ has one terminal connected through a battery $BAT_{19}$ to earth and the other through relay contacts BB1 to earth, and through the contacts ZZdm in the wiper of ZZ2. A capacitor $C_{13}$ and resistor $R_{13}$ are employed to reduce sparking between the contacts ZZdm when in operation. The bank ZZ2 is a homing bank and is connected to earth through relay contacts KF3.

The register section of Figure 5 comprises four uni-selectors M, C, D and U. The uni-selectors are operated by impulses caused by the operation of relay contacts AA1 as will be described later. The moving contact of AA1 is connected through relay contacts H7 to earth and the fixed contact of AA1 is connected through relay contacts $PQ_1$ to the wiper of the uni-selector bank ZZ1. The first four bank contacts of ZZ1 are connected to the windings M, C, D and U respectively whose other terminals are connected to earth through batteries $BAT_{20}$ to $BAT_{23}$ respectively. The first four bank contacts of ZZ1 are also connected through contacts Mdm, Cdm, Ddm and Udm to the wipers of the banks M2, C2, D2 and U2 respectively. Each of these banks is a homing bank. The homing arcs of the homing banks M2, C2, D2 and U2 are connected to earth through relay contacts H6, H3, H4 and H5 respectively.

The fifth contact of ZZ1 is connected through a relay winding PQ and a battery $BAT_{24}$ to earth, and through relay contacts $PQ_3$ and KF4 in series to earth. A relay winding BB is connected between the fixed contact of AA1 and the negative terminal of a battery $BAT_{25}$ whose positive terminal is earthed.

Each of the banks M1, C1, D1 and U1, has an insulated home contact and ten bank contacts. The ten bank contacts of M1 are connected to terminals $MP_1$ to $MP_9$ and $MP_0$ respectively. The ten bank contacts of C1 are connected to terminals $CP_1$ to $CP_9$ and $CP_0$ respectively. The ten bank contacts of D1 are connected to terminals $DP_1$ to $DP_9$ and $DP_0$ respectively, and those of U1 are connected to terminals $UP_1$ to $UP_9$ and $UP_0$ respectively.

The wiper of the bank M1 is connected through a resistor $R_{201}$ to the control grid of a triode valve $V_{100}$ and the wiper of the bank C1 is connected through a rectifier $W_{10}$ to the control grid of the valve $V_{100}$. The anode of this valve is connected to the positive terminal HT+100 of a source (not shown) whose negative terminal is earthed. The cathode of the valve $V_{100}$ is connected to earth through a resistor $R_{202}$ and is connected through a further resistor $R_{203}$ to the control grid of a triode valve $V_{101}$. The wiper of the bank $D_1$ is connected through a rectifier $W_{11}$ to the control grid of the valve $V_{101}$. The cathode of this valve is connected to earth through a resistor $R_{204}$ and is connected through a resistor $R_{205}$ to an output terminal RO. The wiper of the bank $U_1$ is connected through a rectifier $W_{12}$ to the terminal RO.

An input terminal BJO is connected through a resistor $R_{19}$ to the control grid of a gas-filled triode valve $V_8$ whose anode is connected to the positive terminal HT+9 of a source (not shown) of D. C. whose negative terminal is earthed, and whose cathode is connected to earth through a relay winding BR/1. The control grid of the triode $V_8$ is connected through a rectifier $W_{14}$ to the terminal RO.

Figure 6:
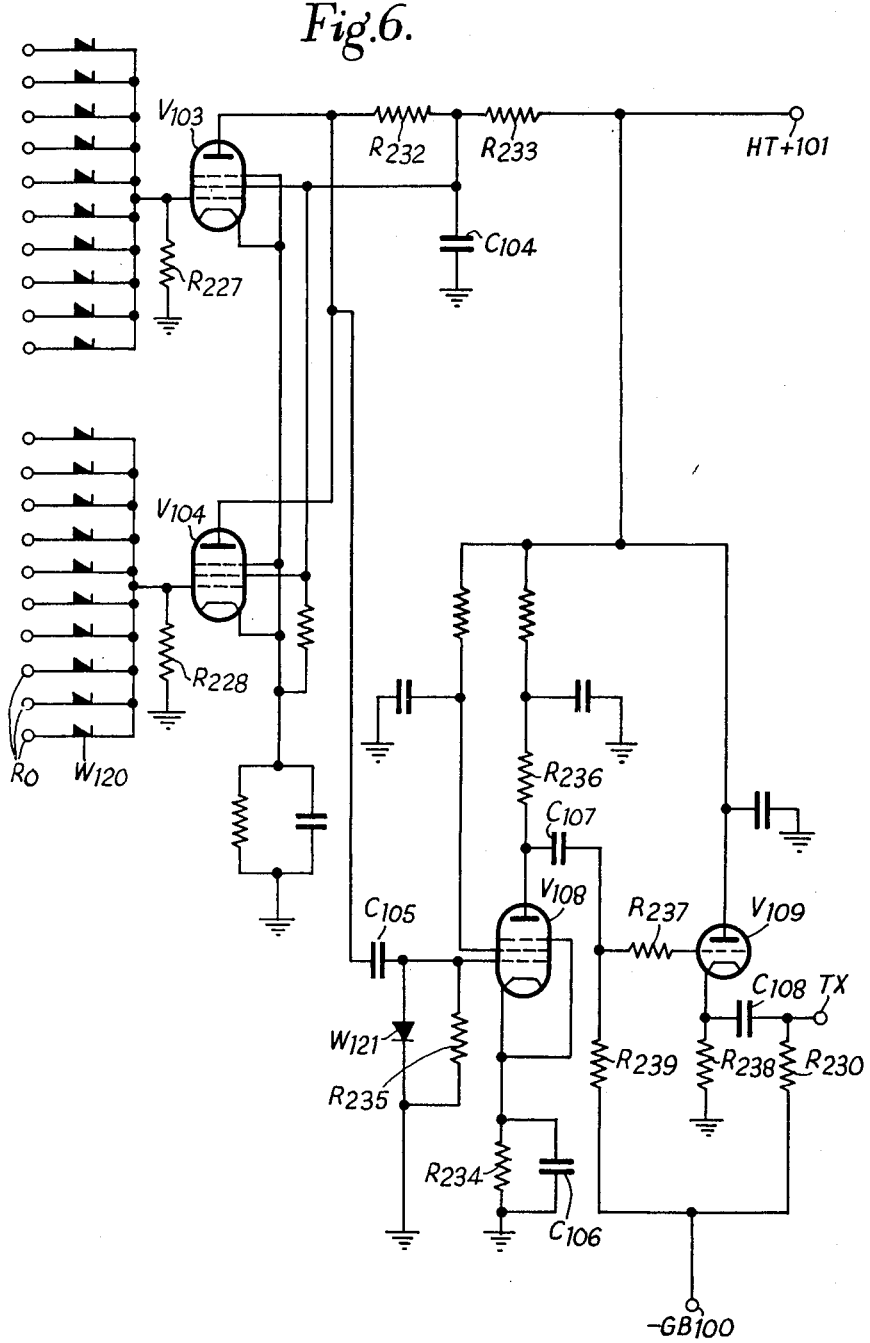
Figure 7:
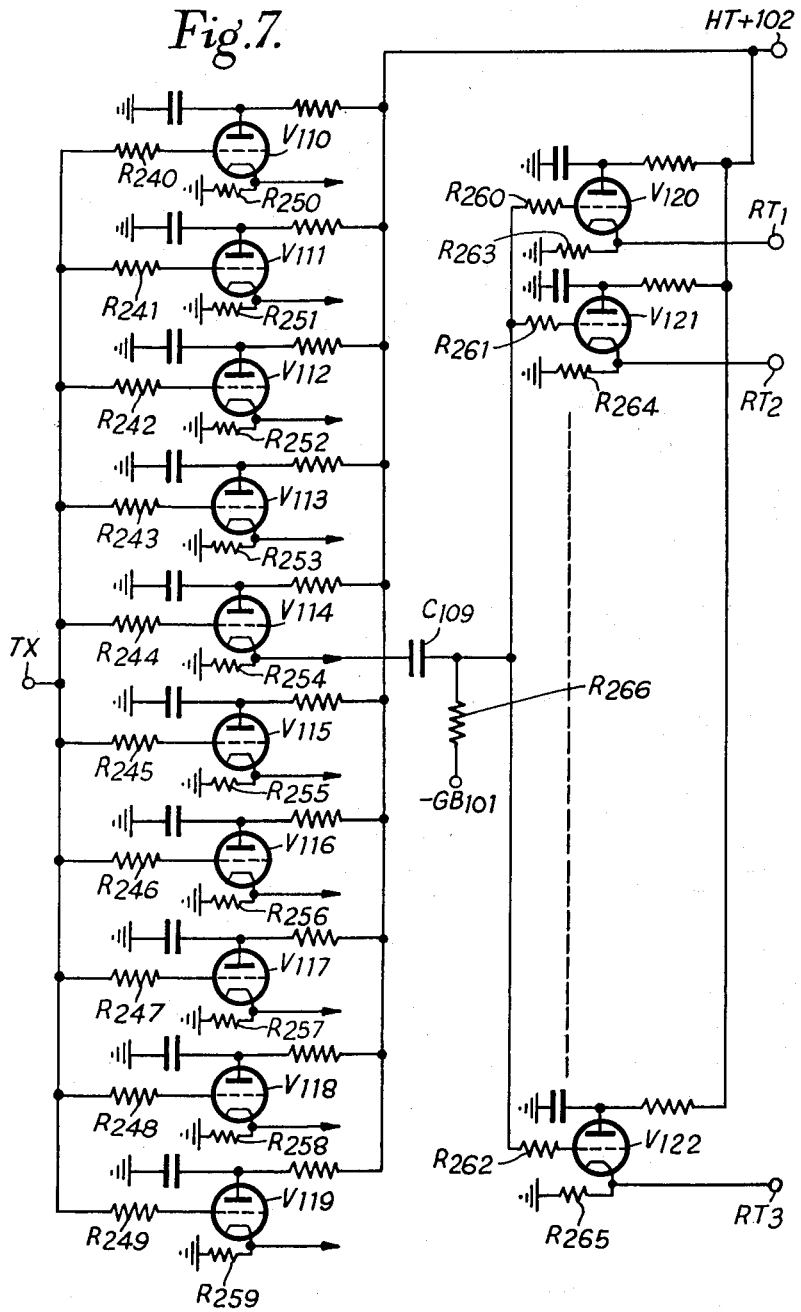

Referring now to Figures 6 and 7, part of the calling junction 25 of Figure 1 is shown in Figure 6, and Figure 7 shows a further part. Assuming 20 registers to be used, the pulses appearing at the output terminals RO of the 20 registers are combined in two groups of ten by means of rectifiers $W_{120}$ as shown in Figure 6. The combined pulses in the first group appear across a resistor $R_{227}$ and those in the second group across a resistor $R_{228}$.

The two groups of pulses appearing across the resistors $R_{227}$ and $R_{228}$ are applied to the control grids of two pentode valves $V_{103}$ and $V_{104}$ respectively which have a common anode load register $R_{232}$. A resistor $R_{233}$ and a capacitor $C_{104}$ are for decoupling purposes. The combined outputs from the valves $V_{103}$ and $V_{104}$ appearing across the common load resistor $R_{232}$ are applied through a capacitor $C_{105}$ to the control grid of a valve $V_{108}$ whose cathode is connected to earth through a self-biasing circuit comprising a resistor $R_{234}$ and a capacitor $C_{106}$. A rectifier $W_{121}$ and a resistor $R_{235}$ are connected in parallel between the control grid of the valve $V_{108}$ and earth and function to render the pulses appearing at the control grid of the valve $V_{108}$ of positive polarity.

The output of the valve $V_{108}$ appearing across a load resistor $R_{236}$ is applied through a capacitor $C_{107}$ and a resistor $R_{237}$ to the control grid of a valve $V_{109}$ which has a cathode load resistor $R_{238}$. Negative bias is applied through a resistor $R_{239}$ to the control grid of the valve $V_{109}$ from the negative terminal —GB100 of a bias source (not shown) whose positive terminal is earthed. The cathode of the valve $V_{109}$ is connected through a capacitor $C_{108}$ to a terminal TX which is also connected through a resistor $R_{230}$ to the terminal —GB100.

In Figure 7 the terminal TX is that also shown in Figure 6 and is connected through resistors $R_{240}$ to $R_{249}$ to the control grids of ten triode valves $V_{110}$ to $V_{119}$ whose cathodes are connected to earth through load resistors $R_{250}$ to $R_{259}$ respectively. The outputs appearing across the cathode load resistors of the ten valves $V_{110}$ to $V_{119}$ are applied to ten groups respectively of triode valves connected as cathode followers. Each of these groups has ten cathode followers and three of the cathode followers in the group connected to the output of the valve $V_{114}$ are shown in Figure 7.

The output voltages appearing at the cathode of the valve $V_{114}$ are applied through a capacitor $C_{109}$ and resistors $R_{260}$ to $R_{262}$ to the control grids of three triode valves $V_{120}$, $V_{121}$ and $V_{122}$ in the group shown. The cathodes of the three valves $V_{120}$ to $V_{122}$ are connected to earth through resistors $R_{263}$ to $R_{265}$ and to three output terminals $RT_1$, $RT_2$ and $RT_3$ respectively. Negative grid bias is applied through a resistor $R_{266}$ to the control grids of the triodes $V_{120}$ to $V_{122}$ from the negative terminal —GB101 of a bias source (not shown) whose positive terminal is earthed.

The anode circuits of all the valves in Figure 7 are decoupled as shown.

Figure 8:
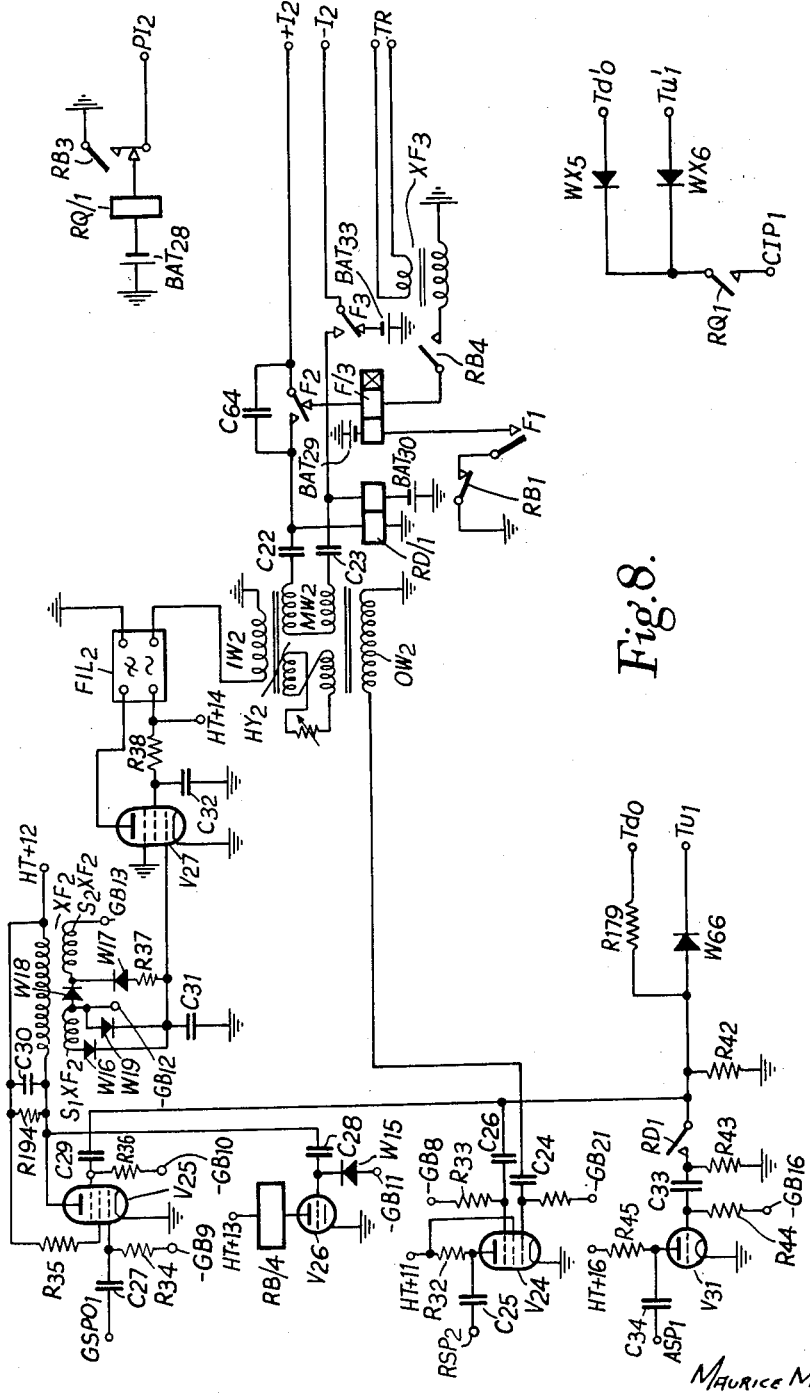

Referring to Figure 8 this is a theoretical circuit diagram of a suitable called unit (16 Figure 1). In Figure 8 a control terminal $PI_2$ is connected through relay contacts $RB_3$ a relay winding RQ and a battery $BAT_{28}$ to earth. The terminal $PI_2$ is connected to one of the PI terminals of the bank $S_3$ of the uniselector in one of the sub's line circuits (Figure 2). Two terminals $+I_2$ and $-I_2$ are connected through relay contacts $F_2$ and $F_3$ respectively, and capacitors $C_{22}$ and $C_{23}$ to a winding $MW_2$ of a hybrid transformer $HY_2$. An output winding $OW_2$ of the transformer $HY_2$ has one terminal earthed and the other terminal thereof is connected through a capacitor $C_{24}$ to the central grid of a pentode valve $V_{24}$ whose cathode is earthed. The anode of the valve $V_{24}$ is connected through a load resistor $R_{32}$ to the positive terminal HT+11 of a source (not shown) of D. C. whose negative terminal is earthed. The anode is also connected through a capacitor $C_{25}$ to an output terminal $RSP_2$, and the screen grid is connected directly to the terminal HT+11. Negative bias is applied to the central grid of the valve $V_{24}$ from a bias terminal —$GB_{21}$. The suppressor grid is connected through a capacitor $C_{26}$ to relay contacts RD1, and through a resistor $R_{33}$ to the negative terminal —$GB_8$ of a bias source (not shown) whose positive terminal is earthed.

An input terminal $GSPO_1$ is connected through a capacitor $C_{27}$ to the control grid of a pentode valve $V_{25}$ whose cathode is earthed. The control grid of the pentode $V_{25}$ is also connected through a resistor $R_{34}$ to the negative terminal —$GB_9$ of a bias source (not shown) whose positive terminal is earthed. The anode of the pentode $V_{25}$ is connected through the primary winding of a transformer $XF_2$ to the positive terminal HT+12 of a source (not shown) of D. C. whose negative terminal is earthed. The anode is also connected through a capacitor $C_{28}$ to the control grid of a triode valve $V_{26}$ whose cathode is earthed. The anode of the triode $V_{26}$ is connected through a relay winding RB to the positive terminal HT+13 of a source (not shown) of D. C. whose negative terminal is earthed. The control grid of the triode $V_{26}$ is connected through a rectifier $W_{15}$ to the negative terminal —$GB_{11}$ of a bias source whose positive terminal is earthed. The screen grid of the pentode $V_{25}$ is connected through a resistor $R_{35}$ to the positive terminal HT+12. The suppressor grid is connected through a resistor $R_{36}$ to the negative terminal —$GB_{10}$ of a bias source (not shown) whose positive terminal is earthed, and through a capacitor $C_{29}$ to the relay contacts CD1.

The transformer $XF_2$ has two secondary windings $S_1XF_2$ and $S_2XF_2$. One terminal of the winding $S_1XF_2$ is connected to the negative terminal —$GB_{12}$ of a bias source (not shown) whose positive terminal is earthed, and the other terminal thereof is connected through a rectifier $W_{16}$ to the control grid of a pentode valve $V_{27}$ whose cathode is earthed. One terminal of the winding $S_2XF_2$ is connected to the negative terminal —$GB_{13}$ of a bias source (not shown) whose positive terminal is earthed, and the other terminal of the winding $S_2XF_2$ is connected through a rectifier $W_{17}$, and a resistor $R_{37}$ to the control grid of the pentode $V_{27}$.

A rectifier $W_{18}$ is connected between the terminal —$GB_{12}$ and the left-hand terminal of the winding $S_2XF_2$ in the drawing.

The primary winding of the transformer $XF_2$ is tuned by a capacitor $C_{30}$ which is shunted by a resistor $R_{194}$.

The anode of the pentode $V_{27}$ is connected through the input circuit of a low-pass filter $FIL_2$ to the positive terminal HT+14 of a source (not shown) of D. C. whose negative terminal is earthed. The screen grid of the pentode $V_{27}$ is connected through a resistor $R_{38}$ to the positive terminal HT+14 and is decoupled by a capacitor $C_{32}$. One output terminal of the low-pass filter $FIL_2$ is connected to earth and the other output terminal is connected through the winding $IW_2$ of the hybrid transformer $HY_2$ to earth.

The terminal $-I_2$ is normally connected to earth through the relay contacts F3 and a battery BAT$_{33}$, and the terminal $+I_2$ is normally connected through the relay contacts F2 and through one winding of a relay F to the moving contact of relay contacts RB4. These contacts are normally open and the fixed contact thereof is connected through the secondary winding of a transformer XF3 to earth. The primary winding of the transformer XF3 is connected to terminals TR to which ringing current is applied from a suitable source (not shown). The contacts F2 are bridged by a capacitor C$_{64}$.

One terminal of the other winding of the relay F is connected through a battery BAT$_{29}$ to earth and the other terminal thereof is connected through relay contacts F1 and RB1 to earth. One winding of a relay RD is connected between the right-hand plate (in the drawing) of the capacitor C$_{22}$ and earth. The other winding of the relay RD has one terminal connected to the right-hand plate of the capacitor C$_{23}$ and has the other terminal connected through a battery BAT$_{30}$ to earth.

The moving contact of contacts RD1 is connected to earth through a resistor R$_{42}$, is connected through a rectifier W$_{66}$ to a terminal $Tu_1$, and is connected through a resistor R$_{178}$ to a terminal $Td_0$.

A terminal $CIP_1$ is connected to the fixed contact of contacts RQ1. The moving contact of contacts RQ1 is connected through a rectifier WX5 to the terminal $Td'_0$ and through a rectifier WX6 to the terminal $Tu'_1$.

Figure 10:
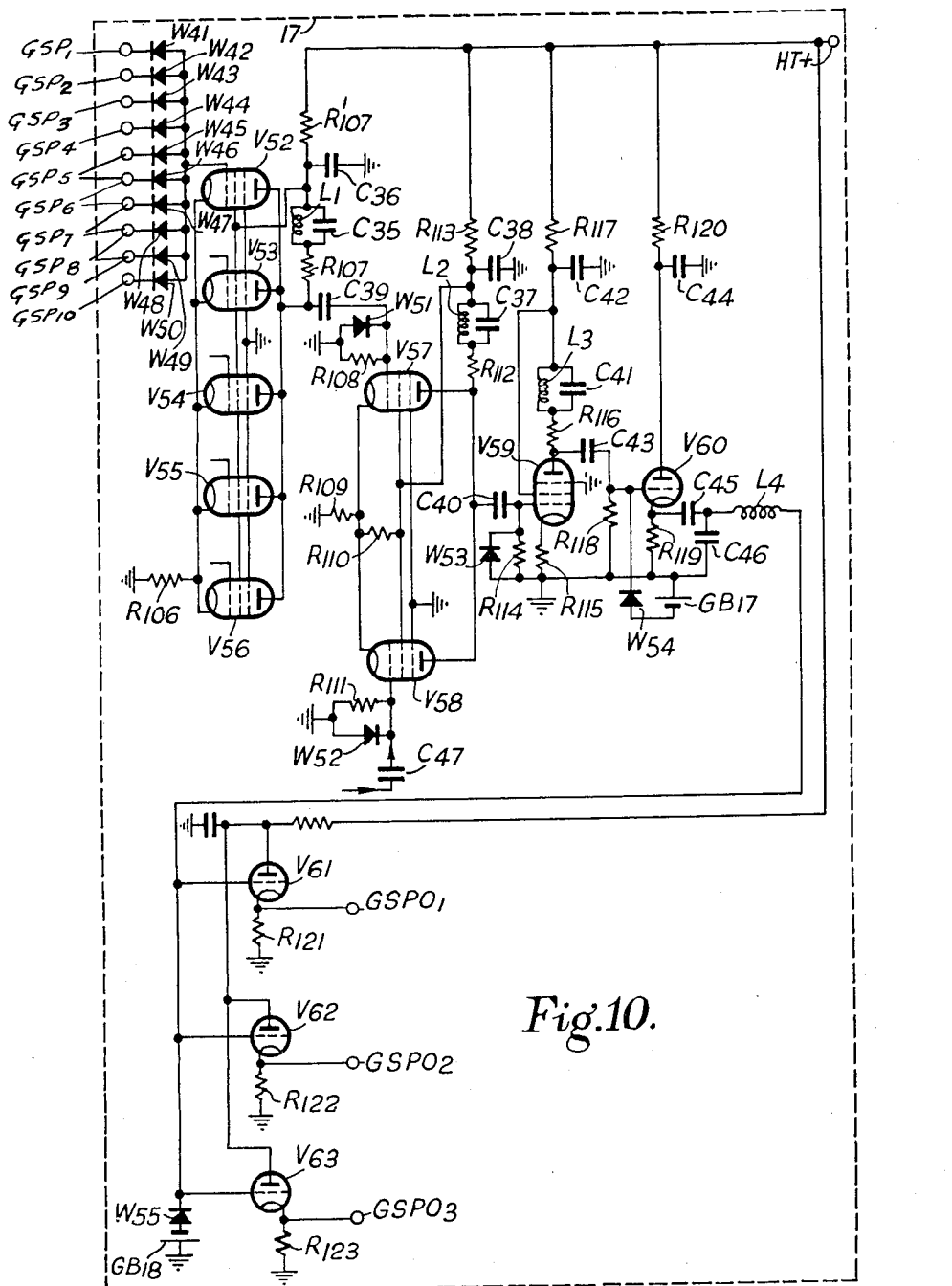

Referring now to Figure 10 this is a circuit diagram of an arrangement suitable for use as the GO speech junctions 17 of Figure 1. The output terminals GSP$_1$ to GSP$_{100}$ of the 100 calling units respectively (see GSP$_1$ of Figure 3) are connected to input terminals GSP$_1$ to GSP$_{100}$ of the arrangement of Figure 10. In Figure 10 only GSP$_1$ to GSP$_{10}$ are shown. The input terminals GSP$_1$ to GSP$_{100}$ are grouped into ten groups of ten terminals each and the ten groups are connected to the control grids of ten pentodes of which five are shown at V$_{52}$ to V$_{56}$. The terminals GSP$_1$ to GSP$_{10}$ are connected through rectifiers W$_{41}$ to W$_{50}$ respectively to the control grid of the pentode V$_{52}$. The other nine groups of input terminals are connected in a like manner to the control grids of the other nine input pentodes respectively. The five pentodes V$_{52}$ to V$_{56}$ have a common cathode resistor R$_{106}$, and the cathodes of the other five input pentodes (not shown) are likewise provided with a common cathode resistor. The anodes of the five input pentodes V$_{52}$ to V$_{56}$ are connected together as shown and have a common wide band anode load comprising a resistor R$_{107}$, an inductor L$_1$ and a capacitor C$_{35}$. A resistor R'$_{107}$ and a capacitor C$_{36}$ are for decoupling purposes. The anode connections of the other five input pentodes are the same as those shown for the pentodes V$_{52}$ to V$_{56}$.

The common anode connection of the five pentodes V$_{52}$ to V$_{56}$ is connected through a capacitor C$_{39}$ to the control grid of a pentode valve V$_{57}$. The common anode connection of the other five input pentodes (not shown) is connected through a capacitor C$_{47}$ to the control grid of a pentode valve V$_{58}$. The control grid of the pentode V$_{57}$ is connected to earth through a rectifier W$_{51}$ and a resistor R$_{108}$ in parallel, and the control grid of the pentode V$_{58}$ is connected to earth through a rectifier W$_{52}$ and a resistor R$_{111}$ in parallel. The screen grids of the two pentodes V$_{57}$ and V$_{58}$ are connected together and through a resistor R$_{110}$ to the common cathode connection of the two pentodes V$_{57}$ and V$_{58}$. The suppressor grids of these two pentodes are earthed.

The anodes of the two pentodes V$_{57}$ and V$_{58}$ are connected together and have a common wide band load comprising a resistor R$_{112}$ and inductor L$_2$ and a capacitor C$_{37}$. A resistor R$_{113}$ and a capacitor C$_{38}$ are for decoupling purposes, and the junction of R$_{113}$ and C$_{38}$ is connected to the screen grids of the two pentodes V$_{57}$ and V$_{58}$.

The anodes of the two pentodes V$_{57}$ and V$_{58}$ are connected through a capacitor C$_{40}$ to the control grid of a pentode valve V$_{59}$. The control grid of this valve is also connected to earth through a rectifier W$_{53}$ and a resistor R$_{114}$ in parallel. The cathode of the pentode valve V$_{59}$ is connected to earth through a resistor R$_{115}$ and the anode has a wide band load comprising a resistor R$_{116}$, an inductor L$_3$ and a capacitor C$_{41}$. A resistor R$_{117}$ and a capacitor C$_{42}$ are for decoupling purposes. The junction of R$_{117}$ and C$_{42}$ is connected to the screen grid of the valve V$_{59}$ and the suppressor grid of the valve V$_{59}$ is earthed.

The anode of the valve V$_{59}$ is connected through a capacitor C$_{43}$ to the control grid of a triode valve V$_{60}$, the control grid also being connected to earth through a resistor R$_{118}$ and in parallel therewith a rectifier W$_{54}$ and bias source GB$_{17}$ connected in series. The valve V$_{60}$ has a cathode load resistor R$_{119}$ and the anode thereof is decoupled by means of a resistor R$_{120}$ and a capacitor C$_{44}$. The load resistor R$_{119}$ is coupled by means of a wide band coupling comprising two capacitors C$_{45}$ and C$_{46}$ and an inductor L$_4$ to the control grids of three cathode follower valves V$_{61}$ to V$_{63}$. The control grids of these valves are also connected to earth through a rectifier W$_{55}$ and bias source GB$_{18}$. The valves V$_{61}$ to V$_{63}$ have cathode load resistors R$_{121}$ to R$_{123}$ respectively and the cathodes are connected to output terminals GSPO$_1$ to GSPO$_3$ respectively.

Although three cathode followers V$_{61}$ to V$_{63}$ have been shown, more may be used if desired.

An arrangement as shown in Figure 10 may also be used as the Return speech junction 18 and as the metering and release junction 19 of Figure 1. When used as the Return speech junction the terminals GSP$_1$ to GSP$_{100}$ are replaced by the terminals RSP$_1$ to RSP$_{100}$ (see RSP$_2$ Figure 8), and the terminals GSPO$_1$ to GSPO$_3$ are replaced by the terminals RSPO$_1$ to RSPO$_3$ (see RSPO$_1$ Figure 3). When the arrangement of Figure 10 is used as the metering and release junction, the terminals GSP$_1$ to GSP$_{100}$ are replaced by the terminals ASP$_1$ to ASP$_{100}$ (see ASP$_1$ Figure 8) and the terminals GSPO$_1$ to GSPO$_3$ are replaced by terminals ASPO$_1$ to ASPO$_3$ (see ASPO$_1$ Figure 3).

Figure 11:
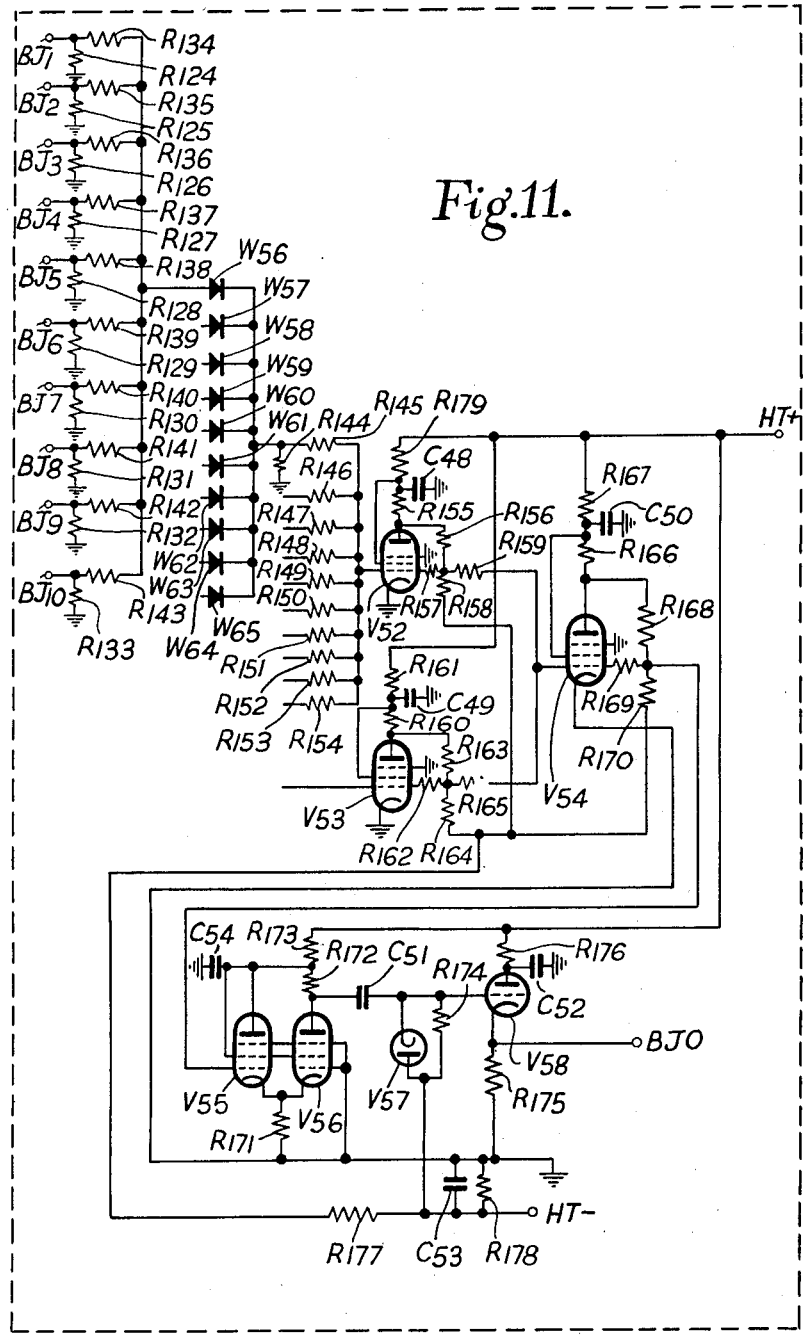

Referring now to Figure 11 this is a circuit diagram of part of the busy junction 20 of Figure 1. The 2,000 input terminals to the busy junction are grouped in groups of ten and of the 200 groups one is shown at BJ$_1$ to BJ$_{10}$ in the figure. These 2,000 terminals are connected to the terminals BJ in the 2,000 sub's line circuits respectively (see BJ$_1$ in Figure 2).

Pulses appearing at the terminals BJ$_1$ to BJ$_{10}$ are combined through resistors R$_{124}$ to R$_{143}$. The combined outputs of the 200 groups are combined in further groups of ten by means of rectifiers the rectifiers of one group being shown at W$_{56}$ to W$_{65}$. The outputs of these 20 groups are combined in two further groups of ten each by means of resistors and a see-saw circuit. One of these groups of resistors is shown at R$_{145}$ to R$_{154}$ which are connected to the control grid of a pentode valve V$_{52}$ connected in a see-saw circuit comprising resistors R$_{155}$, R$_{156}$ and R$_{157}$. The see-saw circuit functions as described in the M. I. T. Radiation Laboratory Series vol. 19, chapter 2, section 5, 27 et seq. Figure 2.12(a) published by the McGraw Hill Book Company Inc. A resistor R$_{179}$ and a capacitor C$_{48}$ are for decoupling the anode circuit of the valve V$_{52}$. The cathode and suppressor grid of this valve are connected to earth, the screen grid to the junction of R$_{179}$ and C$_{48}$, and negative bias for the control grid is supplied from a bias battery through resistors R$_{177}$ and R$_{158}$. The gain of the see-saw circuit is made substantially unity by appropriate selection of the valves of the resistors in the circuit.

The second see-saw circuit comprises a pentode valve V$_{53}$ connected in a circuit identical with that associated with the valve V$_{52}$, and comprising resistors R$_{160}$ to R$_{164}$ and a capacitor C$_{49}$.

The outputs of the two valves $V_{52}$ and $V_{53}$ are combined through two resistors $R_{159}$ and $R_{165}$ and applied to the control grid of a pentode valve $V_{54}$ connected in a further see-saw circuit. The cathode of the pentode is earthed and the anode is coupled to the control grid by means of resistors $R_{166}$, $R_{168}$, $R_{169}$ and $R_{170}$. A resistor $R_{167}$ and a capacitor $C_{50}$ serve to decouple the anode circuit of the valve $V_{54}$.

The junction of the resistors $R_{168}$ to $R_{170}$ is connected to the control grid of a pentode valve $V_{55}$ which is coupled to a further pentode valve $V_{56}$ by means of a resistor $R_{171}$ which is common to the cathodes of both valves $V_{55}$ and $V_{56}$.

The anode circuit of the valve $V_{56}$ contains an anode load resistor $R_{172}$ and is decoupled by means of a resistor $R_{173}$ and capacitor $C_{54}$. The suppressor grids of the valves $V_{55}$ and $V_{56}$ are earthed and their screen grids are connected to the junction of $R_{173}$ with $C_{54}$.

A capacitor $C_{51}$ serves to connect the anode of the valve $V_{56}$ to the control grid of a triode $V_{58}$. D. C. restoration of the voltages applied to the control grid of the valve $V_{58}$ is effected by a diode valve $V_{57}$ and a resistor $R_{174}$. The triode $V_{58}$ has a cathode load $R_{175}$ and acts as a cathode follower the cathode being connected to an output terminal BJO. This terminal is connected to the terminal of like reference in each register (see Figure 5).

The arrangement of Figure 11 may be used as the identification junction 25' of Figure 1.

A suitable high frequency pulse generator (14 of Figure 1) will now be described with reference to Figure 12 (a) to (e). In Figure 12(a) the output of an oscillator $OS_1$ is applied to a ringing circuit comprising a pentode valve $V_{59}$ whose anode circuit includes the primary winding of a transformer $XF_4$. The secondary winding of the transformer $XF_4$ has a centre tap connected to earth through a resistor $R_{181}$ which is decoupled by a capacitor $C_{54}$. The lower end of the secondary winding is connected to the cathode of a diode valve $V_{60}$ whose anode is connected through a resistor $R_{182}$ to the positive terminal HT+18 of a source (not shown) of D. C. whose negative terminal is earthed. The anode of the diode $V_{60}$ is also connected directly to the control grid of a pentode valve $V_{61}$, whose cathode is connected to earth through a bias resistor $R_{183}$ which is decoupled by a capacitor $C_{55}$.

During the positive half cycles of the voltage at the cathode of the diode $V_{60}$ this diode is non-conducting. Thus, the control grid of the valve $V_{61}$ becomes highly positive and anode current of high value flows in the anode circuit of the valve $V_{61}$.

During negative half-cycles of the voltage at the cathode of the diode $V_{60}$ this diode conducts and it is arranged that the voltage at the control grid of the valve 61 falls below the value for anode current cut-off in the valve $V_{61}$. Thus the wave form of the voltage at the anode of the valve $V_{61}$ is substantially rectangular. The "mark-to-space ratio" of this wave form can be varied by changing the values of $R_{181}$ and $R_{183}$. A value of 4:1 is used.

The potential variations at the anode of the valve $V_{61}$ are applied through a cathode follower valve $V_{62}$ to a terminal TA.

A diode valve $V_{63}$ and two pentode valves $V_{64}$ and $V_{65}$ function in like manner to provide rectangular pulses of the same frequency but in anti-phase at a terminal TB.

The output of the valve $V_{65}$ is differentiated by a capacitor $C_{57}$ and resistor $R_{187}$ then applied through an inverter comprising a valve $V_{66}$ to a terminal TC.

In Figure 12(b) the input terminal TC which corresponds to the terminal TC in Figure 12(a) is coupled through two diode valves $V_{67}$ and $V_{68}$ to a multivibrator comprising two valves $V_{69}$ and $V_{70}$. The multivibrator functions in known manner as a frequency divider and provides a division ratio of 5:1. The output voltage of this multi-vibrator is fed through a cathode follower valve $V_{71}$ to an output terminal TD. The output applied to TD is also differentiated by a capacitor $C_{58}$ and resistor $R_{188}$ and applied to a phase inverter comprising a pentode valve $V_{72}$.

The output of this phase inverter is fed through two diodes $V_{73}$ and $V_{74}$ to a multivibrator comprising two pentodes $V_{75}$ and $V_{76}$. This multivibrator functions as a frequency divider and provides a division ratio of 2:1, and its output is applied through a phase splitter comprising a valve $V'_{73}$ to two terminals TE and TF. The voltage applied to the terminal TF is also differentiated by a capacitor $C_{59}$ and resistor $R_{189}$ and applied through a phase inverter comprising a valve $V'_{74}$, to a terminal TG.

In Figure 12(c) the terminal TG, which corresponds to the terminal TG of Figure 12(b) is connected to a further multivibrator $MV_1$ which functions as a frequency divider and provides a division ratio of 5:1. The output of $MV_1$ is applied through a cathode follower $CF_1$ to a terminal TH.

In Figure 12(d) the terminal TD corresponds to the terminal TD of Figure 12(b) and is connected to the input of a delay network $DL_1$ of known kind which has ten equally spaced taps $T_1$ to $T_{10}$ respectively and is terminated by a notched termination $R_{184}$. The delay of the network $DL_1$ is made equal to the recurrence period of the pulses applied at the terminal TD from the valve $V_{71}$ of Figure 12(b), and the delay from the input to the first tap $T_1$ is made equal to the delay between adjacent taps.

The terminal TH in Figure 12(d) corresponds to the terminal TH of Figure 12(c) and is connected to the input end of a delay network $DL_2$ which has ten equally spaced taps $T_{11}$ to $T_{20}$. The delay of the network is made equal to the recurrence period of the pulses applied at TH and the delay from the input to the tap $T_{11}$ is made equal to the delay between adjacent taps. The network $DL_2$ is terminated by a matched termination $R_{185}$.

The pulse generator is provided with twenty output circuits of which one is shown in Figure 12(e). In Figure 12(e) an input terminal $T_1$ which corresponds to $T_1$ in Figure 12(d) is connected to the control grid of a pentode $V'''_{74}$. An input terminal TA which corresponds to TA in Figure 12(a) is connected to the suppressor grid of the pentode $V'''_{74}$. A cathode bias resistor $R_{186}$ decoupled by a capacitor $C_{56}$ provides bias for the pentode and by means of a diode $V'''_{75}$ the suppressor grid is kept normally at negative potential as a result of the D. C. restoration action of the diode in response to the positive going pulses applied at the terminal TA. This negative potential on the suppressor grid is arranged to be sufficient to render the pentode $V'''_{74}$ normally conducting. Thus the pentode $V'''_{74}$ acts as a gate and a pulse applied to the terminal $T_1$ passes through the gate only if a pulse is simultaneously applied to the terminal TA.

The output of the valve $V'''_{74}$ is applied through a phase inverter $V'''_{76}$ and a cathode follower $V_{77}$ to an output terminal $Tu_0$.

The other 19 output circuits are identical with that shown in Figure 12(e) and their outputs appear at terminals $Tu_1$ to $Td_9$ respectively.

The terminal TA is also connected to the suppressor grids of the gates in the four output circuits connected to the terminals $Tu_2$, $Tu_4$, $Tu_6$ and $Tu_8$ and the terminals $T_3$, $T_5$, $T_7$ and $T_9$ are connected to the control grids of these four gates.

The terminal TB of Figure 12(a) is connected to the suppressor grids of the gates in the five output circuits connected to the terminals $Tu_1$, $Tu_3$, $Tu_5$, $Tu_7$ and $Tu_9$ and the terminals $T_2$, $T_4$, $T_6$, $T_8$ and $T_{10}$ are connected to their control grids.

The terminal TE is connected to the suppressor grids of the gates of the five output circuits connected to the terminals $Td_0$, $Td_2$, $Td_4$, $Td_6$ and $Td_8$ and the terminals $T_{11}$, $T_{13}$, $T_{15}$, $T_{17}$ and $T_{19}$ are connected to the control grids thereof respectively.

The terminal TF of Figure 12(b) is connected to the suppressor grids of the gates in the remaining five output circuits and the terminals $T_{12}$, $T_{14}$, $T_{16}$, $T_{18}$ and $T_{20}$ of Figure 12(d) are connected to the control grids thereof respectively.

Figure 13:
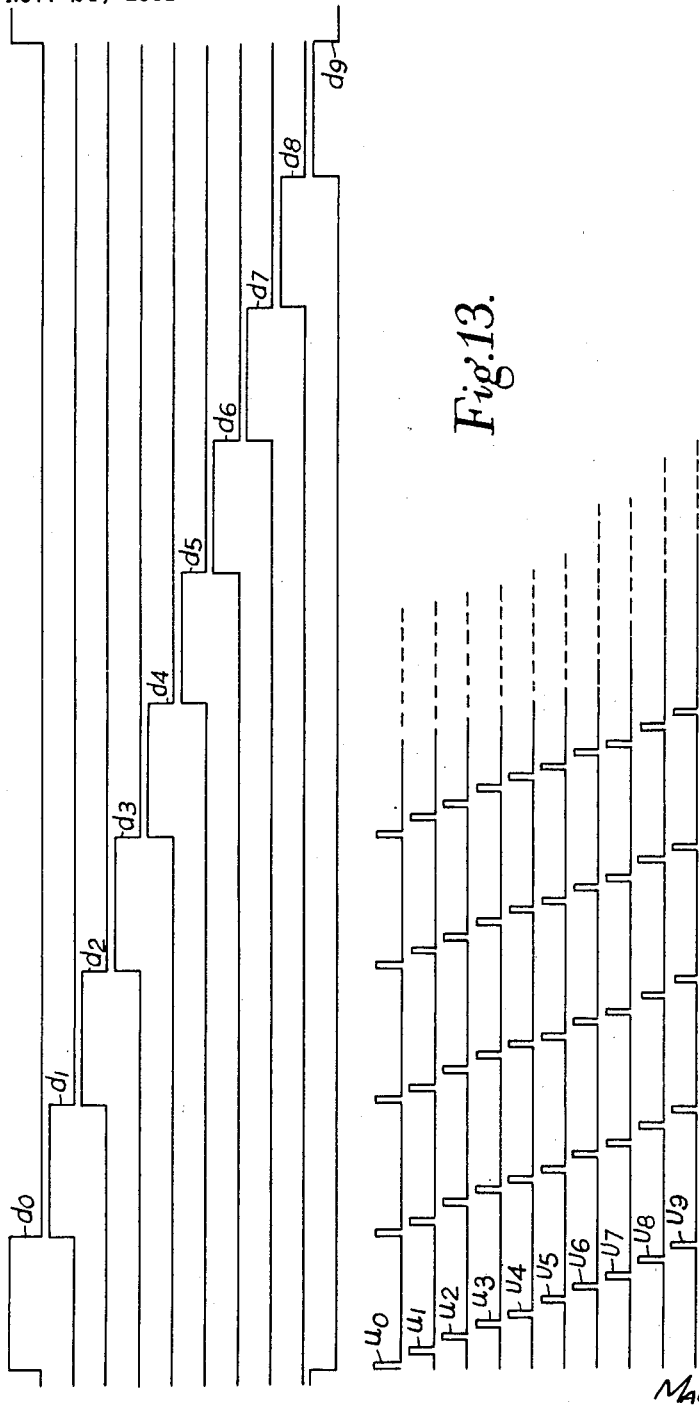
Figure 13 is an explanatory diagram.

Thus the pulses appearing at the terminals $Td_0$ to $Td_9$ are as shown at $d_0$ to $d_9$ in Figure 13, and the pulses appearing at the terminals $Tu_0$ to $Tu_9$ are as shown at $u_0$ to $u_9$ in Figure 13.

The pulses $d_0$ to $d_9$ and $u_0$ to $u_9$ are combined in gates (of which two will be described later) to provide the 100 communication channels. For example the pulses $d_3$ are applied to open and close a gate to which the pulses $u_4$ are applied to provide channel No. 34. Only one of the $u_4$ pulses passes through this gate during each $d_3$ pulse as will be seen from an examination of Figure 13. 100 $u$ pulses occur during each cycle of a $d$ pulse and the 100 $u$ pulses are gated by the $d$ pulses to provide the 100 channels.

The pulse width of the $u$ pulses, and hence the channel pulses, is arranged to be about 0.5 $u$. sec. and the recurrence frequency of the pulses in each channel is arranged to be about 8,000 per second.

Figure 14:
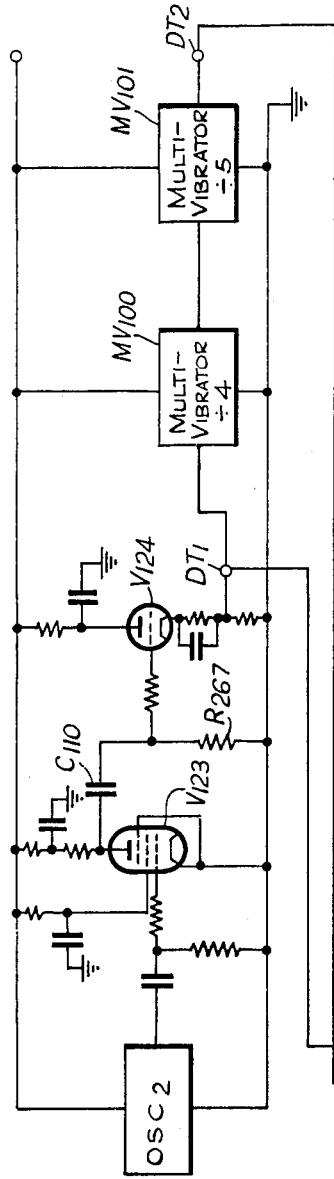
Figures 14 and 15 are diagrams of further parts shown in block form in Figure 1.

Referring to Figure 14 this is a diagram of a suitable pulse generator for use at 21 in Figure 1. The generator shown comprises an oscillator OSC$_2$ which generates sine waves at a frequency of 200 kc./s. The output of the oscillator OSC$_2$ is converted into an oscillation of square wave form by a known circuit including a valve $V_{123}$ and the oscillations of square wave form are differentiated by a circuit comprising a capacitor $C_{110}$ and a resistor $R_{267}$. The narrow pulses resulting from the differentiation are applied to the control grid of a valve $V_{124}$ connected as a cathode follower and the positive-going pulses appearing at the cathode of the valve $V_{124}$ at a frequency of 200,000 p. p. s. are passed to a terminal DT$_1$.

A first connection is made from the terminal DT$_1$ to a mono-stable multi-vibrator MV$_{100}$ which is arranged in known manner to function as a frequency divider providing a division ratio of 4:1. The output of the multi-vibrator MV$_{100}$ is passed to a second mono-stable multi-vibrator MV$_{101}$ which also acts as a frequency divider and provides a division ratio of 5:1. The output pulses from the multi-vibrator MV$_{101}$ which are of a frequency of 10,000 p. p. s. are passed to a terminal DT$_2$.

A second connection is made from the terminal DT$_1$ to a system of twenty bi-stable multi-vibrators of which four are shown at MV$_{102}$, MV$_{103}$, MV$_{104}$ and MV$_{105}$ respectively. The terminal DT$_2$ is also connected to the system of multi-vibrators MV$_{102}$ to MV$_{105}$.

A second connection is made from the terminal DT$_1$ to a system of twenty bi-stable multi-vibrators of which four are shown at MV$_{102}$, MV$_{103}$, MV$_{104}$ and MV$_{105}$ respectively. The terminal DT$_2$ is also connected to the system of multi-vibrators MV$_{102}$ to MV$_{105}$.

The pulses appearing at the terminal DT$_2$ are arranged to "switch on" the first multi-vibrator MV$_{102}$ in the system of twenty. After 5 micro-seconds however a pulse is applied from the terminal DT$_1$, which switches off the multi-vibrator MV$_{102}$. The coupling between the multi-vibrators MV$_{102}$ and M$_{103}$ is made in accordance with known technique such that when the multi-vibrator MV$_{102}$ is switched off the multi-vibrator MV$_{103}$ is switched on. This process continues until all twenty of the multi-vibrators have been switched on and off in turn each one remaining switches on for a period of 5 microseconds.

Just as the last multi-vibrator is switched off the next pulse appears at the terminal DT$_2$ and the whole process is repeated. The twenty output terminals $Td'_0$ to $Tu'_9$ are connected to the twenty bi-stable multi-vibrators respectively.

Figure 15:
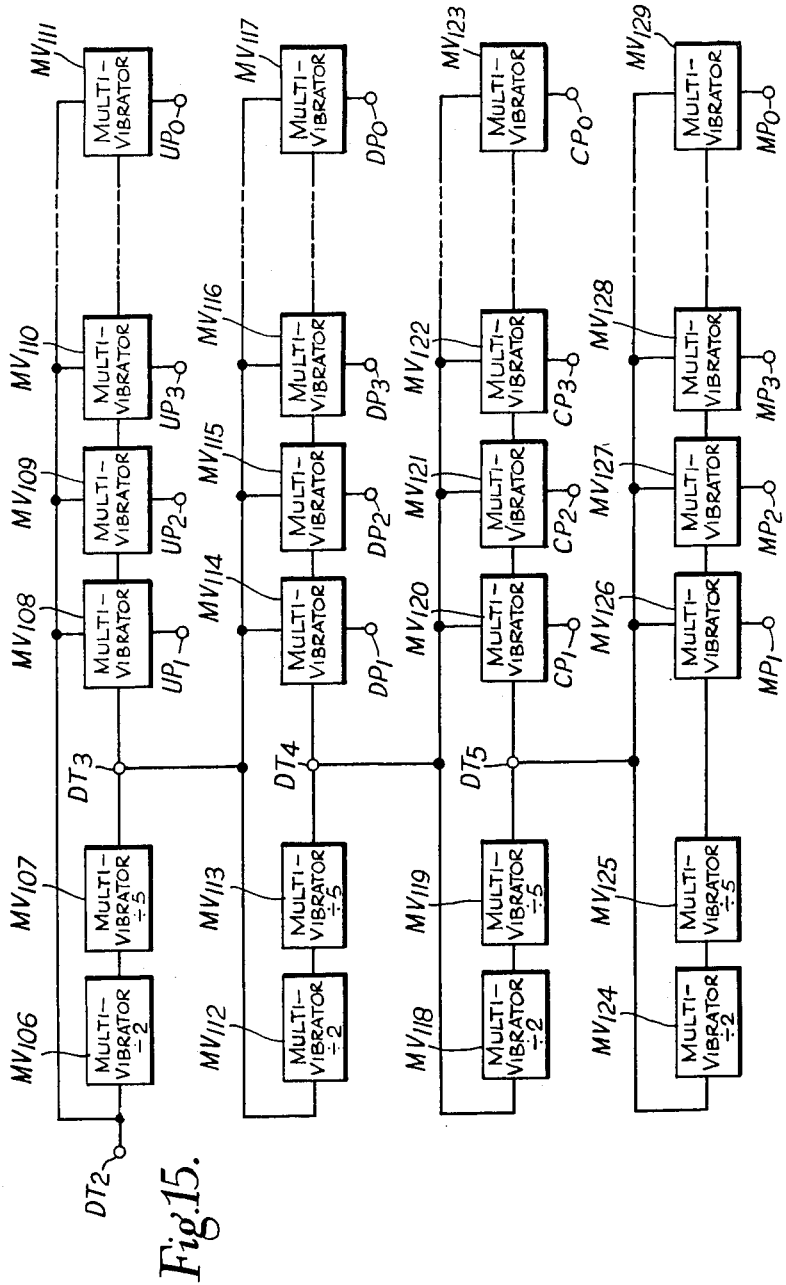

Referring to Figure 15, this is a block schematic diagram of a suitable pulse generator for use at 26 in Figure 1. The terminal DT$_2$ is the terminal DT$_2$ in Figure 14 at which pulses having a recurrence fequency of 10,000 p. p. s. appear, and is connected through two cascaded multi-vibrators MV$_{106}$ and MV$_{107}$ to a terminal DT$_3$. The multi-vibrators MV$_{106}$ and MV$_{107}$ are arranged to function as frequency dividers providing division ratios of 2:1 and 5:1 respectively whereby an overall division ratio of 10:1 is obtained. Thus the pulses appearing at the terminal DT$_3$ occur at 1,000 p. p. s. These pulses are fed into a system of ten bistable multi-vibrators of which four are shown at MV$_{108}$ to MV$_{111}$. The pulses appearing at the terminal DT$_2$ are also applied direct to the multi-vibrators MV$_{108}$ to MV$_{111}$. It is arranged, as in Figure 14, that a pulse applied to the multi-vibrator MV$_{108}$ switches it on and the next succeeding pulse from the terminal DT$_2$ direct switches off the multi-vibrator MV$_{108}$. The multi-vibrator MV$_{108}$ on being switched off switches on the multi-vibrator MV$_{109}$ which is switched off by the next succeeding pulse applied direct from the terminal DT$_2$. This process is repeated until all ten multi-vibrators in the row have been switched on and off in turn. Thus each of the multi-vibrators is switched on for 100 microseconds at a recurrence frequency of 1,000 per second. The output pulses from the ten multi-vibrators are applied to ten output terminals UP$_1$ to UP$_9$ and UP$_0$ respectively which correspond to the terminals of like reference in Figure 5.

The pulses appearing at the terminal DT$_3$ at the frequency of 1,000 p. p. s. are passed through two further cascaded multi-vibrators MV$_{112}$ and MV$_{113}$ to a terminal DT$_4$. The multi-vibrators MV$_{112}$ and MV$_{113}$ provide division ratios of 2:1 and 5:1 respectively and hence an overall division ratio of 10:1. Thus the pulses appearing at the terminal DT$_4$ have a recurrence frequency of 100 p. p. s.

These pulses are applied to a further system of ten multi-vibrators of which four are shown at MV$_{114}$ to MV$_{117}$. These function in the same manner as the multi-vibrators MV$_{108}$ to MV$_{111}$ and provide ten trains of output pulses at the terminals DP$_1$ to DP$_9$ and DP$_0$ respectively which correspond to the terminals of like reference in Figure 5. The duration of each of these pulses is one millisecond and the pulses in each train occur at a recurrence frequency of 100 p. p. s.

The pulses appearing at the terminal DT$_4$ are also applied through two cascaded multi-vibrators MV$_{118}$ and MV$_{119}$ to a terminal DT$_5$. The multi-vibrators MV$_{118}$ and MV$_{119}$ provide a collective division ratio of 10:1 and hence the pulses at the terminal DT$_5$ recur at 10 p. p. s. These are applied to another system of ten bi-stable multi-vibrators of which four are shown at MV$_{120}$ to MV$_{123}$. This system functions in the same manner as those already described to provide ten trains of output pulses at the ten output terminals CP$_1$ to CP$_9$ and CP$_0$ respectively. The pulses in each of these trains recur at 10 p. p. s. and have a duration of ten milliseconds each.

The pulses appearing at the terminal DT$_5$ are applied through two cascaded multi-vibrators MV$_{124}$ and MV$_{125}$ to a final system of ten bi-stable multi-vibrators of which four are shown at MV$_{126}$ to MV$_{129}$. The multi-vibrators MV$_{124}$ and MV$_{125}$ provide a collective division ratio of 10:1 and the final system of multivibrators functions in a like manner to those already described to provide ten trains of output pulses at the terminals MP$_1$ to MP$_9$ and MP$_0$ respectively. The pulses in these ten trains recur at one p. p. s. and each pulse has a duration of 100 milliseconds.

Figure 16:
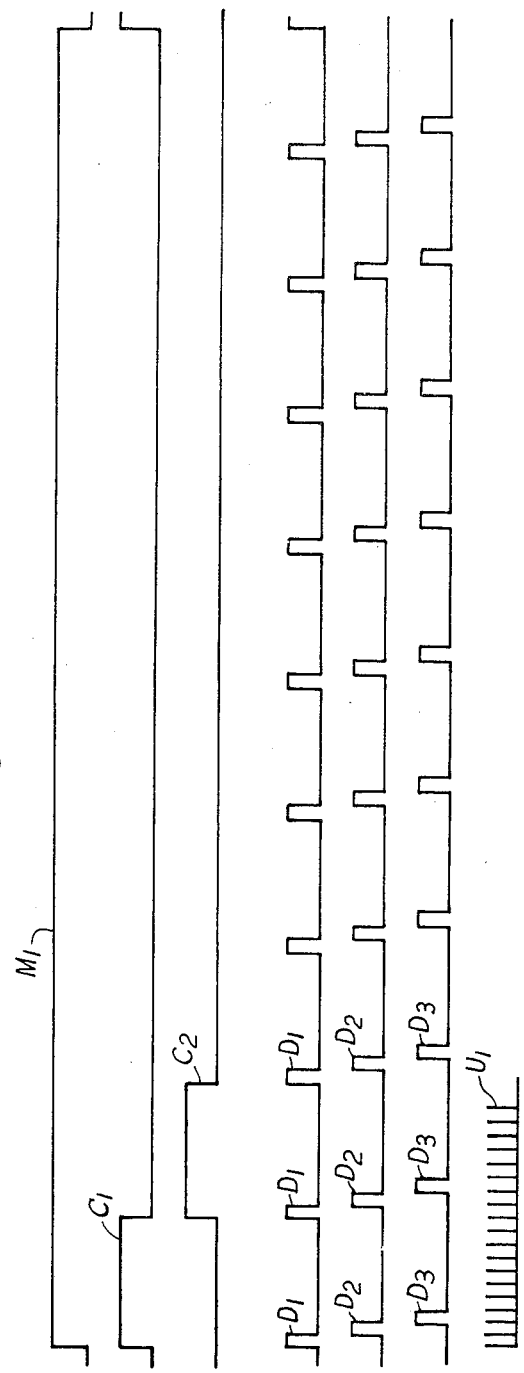
Figure 16 is a further explanatory diagram.

Referring to Figure 16 this shows one of the pulses M$_1$ which occur at the output terminal MP$_1$ of Figure 15. During each M$_1$ pulse ten C pulses (C$_1$ to C$_9$ and C$_0$) occur at the terminals CP$_1$ to CP$_9$ and CP$_0$ (Figure 15) respectively. Two of these C pulses are shown at C$_1$ and C$_2$. During each C pulse ten D pulses (D$_1$ to D$_9$ and $D_0$) occur at the terminals $DP_1$ to $DP_9$ and $DP_0$ respectively (Figure 15). Three trains $D_1$, $D_2$ and $D_3$ of the D pulses are shown. During each D pulse ten U pulses ($U_1$ to $U_9$ and $U_0$) occur at the terminals $UP_1$ to $UP_0$ respectively (Figure 15). One train of $U_1$ pulses is shown in Figure 16.

Figure 17:
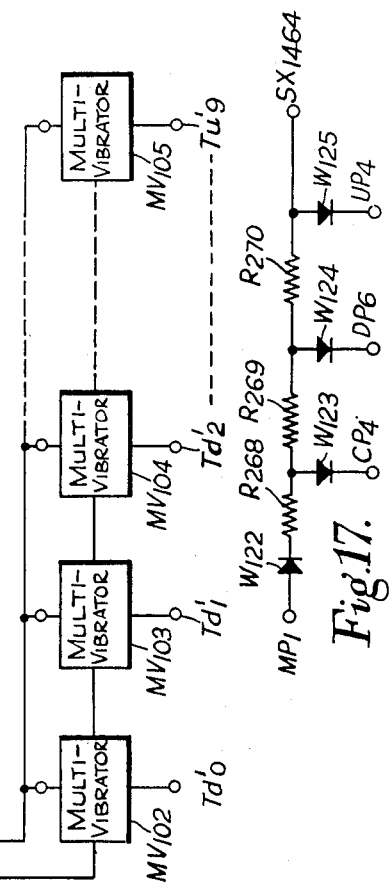
Figure 17 is a diagram of a gate circuit.

In addition to what is shown in Figure 15 the pulse generator 26 comprises 2,000 gate circuits (one per subscriber) of which one is shown in Figure 17. The function of these circuits is to provide a recurring sequence of 2,000 gating pulses each of 100 micro-seconds duration, the sequence recurring at the rate of once per second, and the several pulses in each sequence being applied to the 2,000 sub's line circuits respectively.

The circuit shown in Figure 17 is for providing the gating pulses for the sub's line circuit number 1464. The terminal $MP_1$ of Figure 15 is connected through a rectifier $W_{122}$ and a resistor $R_{268}$ to the anode of a rectifier $W_{123}$ whose cathode is connected to the terminal $CP_4$ of Figure 15. The anode of the rectifier $W_{123}$ is connected through a resistor $R_{269}$ to the anode of a rectifier $W_{124}$ whose cathode is connected to the terminal $DP_6$ of Figure 15. The anode of the rectifier $W_{124}$ is connected through a resistor $R_{270}$ to the anode of a rectifier $W_{125}$ and to an output terminal $SX_{1464}$.

In operation the $M_1$ pulses pass through the rectifier $W_{122}$ and resistor $R_{268}$ to the rectifier $W_{123}$ which is normally conducting and provides a low impedance path whereby the $M_1$ pulses are dropped across the resistor $R_{268}$. Whenever a $C_4$ pulse occurs at the terminal $CP_4$ however the rectifier $W_{123}$ is rendered insulating and hence that part of each $M_1$ pulse which occurs during a $C_4$ pulse passes through the resistor $R_{269}$ to the rectifier $R_{124}$. This rectifier is normally conducting and provides a low impedance path except during the occurrence of $D_6$ pulses applied from the terminal $DP_6$. Thus only that part of each $M_1$ pulse which occurs during both a $D_6$ and $C_4$ pulse passes through the resistor $R_{270}$ to the rectifier $W_{125}$. This is rendered non-conducting only during the $U_4$ pulses applied to the terminal $UP_4$ and hence the only part of each $M_1$ pulse, in this example, to pass to the output terminal $SX_{1464}$ is the part which occurs during a $U_4$ pulse a $D_6$ pulse and a $C_4$ pulse.

*Operation*

It will be assumed that the subscriber at the station 10 of Figure 1 is calling the subscriber at the station 11 and that the number of the station 11 is 1464.

When the subscriber at the station 10 lifts his telephone handset from its rest a connection is automatically made from the terminal $LT_1$ of Figure 2 through the subscriber's line and telephone set back to the terminal $LT_2$. Thus a circuit is completed from earth through the battery $BAT_1$ and the relay winding L back to earth. The relay therefore operates and its contacts L1 and L2 close.

These contacts complete the automatic stepping circuit for the uniselector S, this circuit being from earth through the battery $BAT_2$, the winding S, mechanically operated contacts $Sdm$, the relay contacts K4, the relay contacts L2, the wiper and home contact of the bank S3 and the contacts L1 back to earth. The uniselector commences to hunt.

Referring now to Figure 3 (calling unit) it is arranged that when a calling unit is in use the terminal PO thereof ($PO_1$ in Figure 3) is earthed through contacts B1 as will be described later. When, however, the calling unit is free the contacts B1 are open (as will be described later) and the earth is removed from the terminal PO thereof.

Referring again to Figure 2, so long as the wiper of the bank S3 is passing over contacts connected to engaged calling units the automatic stepping circuit of the uniselector remains completed through the earthed terminals PO in those units. When, however, a contact connected to a free calling unit is reached the PO terminal thereof is not earthed and hence the automatic stepping circuit is broken and the motion of the wiper arrested.

The relay K is then energised through a circuit comprising the battery $BAT_2$, the winding S, the contacts $Sdm$, and the relay contacts L1. The resistance of the relay winding K is made sufficiently high to prevent further operation of the stepping circuit as a result of the current flowing in the circuit of the relay winding K.

Relay contacts K1 to K7 close. Contacts K1 and K2 connect the terminals $LT_1$ and $LT_2$ through to the wipers of the uniselector banks S1 and S2. Assuming the wiper of the bank S3 to be arrested on contact $PO_1$, the wipers of S1 and S2 connect the terminals $LT_1$ and $LT_2$ to the terminals $+O_1$ and $-O_1$ respectively.

Whilst this is occurring the circuit in the seized calling unit operates to put an earth on the terminal $PO_1$ as will be described later.

When the relay contacts K1 and K2 close the relay winding L becomes de-energised and the relay contacts L1 and L2 open. The relay K remains operated however because of the earth applied to the terminal $PO_1$ by the seized calling unit.

The operation of the remainder of the circuit of Figure 2 will be described later.

Referring now to Figure 3, assuming this to be the seized calling unit current flows from earth through the left-hand winding of the relay windings A, through the relay contact D1, through the calling subscriber's line, back through the relay contacts D2, through the right-hand winding A and through the battery $BAT_3$ to earth. Thus the relay A operates and its contacts A1 and A2 close.

The contacts A2 apply an earth to the cathode of the gas-filled triode $V_2$, and hence prepare this valve for later operation.

The contacts A1 complete the circuit of the relay winding B the circuit being from earth through the battery $BAT_9$ through the winding B and the contacts A1 to earth. The relay contacts B1 to B5 close. The contacts B1 apply an earth to the terminal $PO_1$. The contacts B2 prepare a circuit for transmitting subsequent dialling impulses to the terminal IMP. The contacts B3 connect the terminal $P_1$ to the contacts E3 and thence through the left-hand relay winding E to the negative terminal of the battery $BAT_6$. The contacts B4 put an earth on the busbar $BUS_1$. The contacts B5 connect the terminal GP to the suppressor grids of the two valves $V_4$ and $V_5$.

The manner in which a register is allotted to the seized calling unit will now be described. An earth is applied to the terminal AL through the contacts B4, the busbar $BUS_1$, and the contacts E2.

Referring now to the register and calling unit finder circuit of Figure 5, whenever a register is free an earth is put on to the terminal R through the contacts KF6, and a connection is made from earth through the battery $BAT_{17}$ and the contacts KF5 to the terminal Q.

Referring to the allotter circuit of Figure 4 the earth on the terminal AL from the seized calling unit completes the energising circuit of the relay ST through the battery $BAT_{11}$. Thus contacts ST1, ST2 and ST3 close. The automatic stepping circuit of the uniselector FD is completed from earth through the battery $BAT_{12}$, the winding FD, the mechanically operated contacts $FDdm$, and the contacts ST1, DK1 and ST3 to the earthed terminal R of a free register. Thus the uniselector commences to hunt.

The contacts ST2 connect the relay winding DK between the earthed terminal R and the wiper of the uniselector bank FD1. When the terminal Q of the free register is reached by the wiper of the bank FD1 the energising circuit of the winding DK is completed through the contacts KF5 (Figure 5) and the battery $BAT_{17}$.

The contacts DK1 operate and hence break the automatic stepping circuit of the uniselector FD, and complete the energising circuit of the relay winding DR from the earthed terminal R through the contacts ST3 and DK1, the winding DR and the battery BAT$_{13}$ to earth. Thus the contacts DR1 to DR4 close.

The contacts DR1 complete a circuit from earth, through the contacts DR1, the contacts FK1, the bank FD2, the terminal Y, the mechanically operated contacts CUF$dm$ (Figure 5), the operating winding CUF and the battery BAT$_{15}$ to earth. Thus the uniselector CUF of Figure 5 commences to hunt.

When the wiper of the bank CUF$_5$ reaches the terminal P$_1$ connected to the terminal of the same reference in the seized calling unit (Figure 3) a circuit is completed from earth through the battery BAT$_6$ (Figure 3), the left-hand winding of the relay E, the contacts E3 and B3, the terminal P$_1$, the uniselector bank CUF$_5$ (Figure 5), the terminal P$_2$, the uniselector bank FD3 (Figure 4), the contacts DR2 and the left-hand winding of the relay FK. Thus the relay E of Figure 3 and the relay FK of Figure 4 are energised. The contacts FK1 in Figure 4 also complete a circuit from earth through the battery BAT$_{14}$, the right-hand winding of relay FK, the contacts FK1 and DR1 to earth. This circuit holds the relay FK energised until released as will be described later.

In Figure 4 the contacts FK1 and FK2 close. The contacts FK1 complete a circuit from earth through the contacts DR1, FK1 and DR3, the uniselector bank FD4, the terminal X, the relay winding KF (Figure 5) and a battery BAT$_{18}$ to earth. Thus the relay KF of Figure 5 is energised. The opening of the contacts KF2 arrests the motion of the wipers of the uniselector CUF, the earth having already been removed from the terminal Y by the operation of the contacts FK1 of Figure 4. The contacts KF5 (Figure 5) disconnect the battery BAT$_{17}$ from the terminal Q. The contacts KF6 remove the earth from the terminal R and earth the terminals P$_2$ and P$_1$. The contacts KF3 remove the earth from the homing arc of the uniselector bank ZZ2, and the contacts KF4 prepare an earth for the contacts PQ3.

When the earth is removed from the terminal R (Figure 5) and the battery BAT$_{17}$ disconnected from the terminal Q by operation of the relay KF the relay DK of Figure 4 is released. The operation of the contacts DK1 releases the relay DR and the contacts DR1 opening break the energising circuit of the right-hand winding of the relay FK. Referring to Figure 3, when the relay E is energised as previously described the contacts E1 are arranged to close before any other contacts of this relay. A holding circuit is then completed from earth through the contacts B4, the contacts E1, the right-hand winding of the relay E, and the battery BAT$_5$ to earth. Operation of the contacts E3 earths the terminals P$_1$ and hence releases the relay FK of Figure 4. Contacts E2 open and remove the earth from the terminal AL. The allotter is, therefore, released and the wipers thereof home to their home contacts.

Until the allotter is released the contacts FK2 and DR4 (Figure 4) serve to hold the uniselector FD.

Referring to Figure 3 the contacts E4 complete a circuit from earth through the contacts A1, E4 and D5 to the terminal HO. The terminal HO of Figure 5 is connected through the uniselector bank CUF4, through the relay winding H and the battery BAT$_{32}$ to earth. The relay H is therefore operated. The contacts H1 to H8 close and the contacts H2 serve to hold the relay winding KF energised, and hence to hold the register connected to the seized calling unit.

The contacts E5 (Figure 3) connect the charged capacitor C$_{12}$ to the control grid of the valve V$_2$ which, therefore, strikes and energises the relay winding F. The contacts F1 close and hence dialling tone is fed to the calling subscribers' line through the windings of the relay A.

When the calling subscriber dials the number he requires (1464 in this example) the dialling impulses operate the relay A and hence the contacts A1.

The relay H of Figure 5 is slow acting and hence is not affected by the rapid operation of the contacts A1 of Figure 3. The contacts H1 connect the terminal IMP through the uniselector bank CUF1, the relay winding AA and the battery BAT$_{16}$ to earth. Thus the operation of the contacts A1 of Figure 3 is followed by the contacts AA1 of Figure 5. The contacts H7 earth the moving contact of the contacts AA1 and hence each time the contacts AA1 are closed by a dialling impulse of the first digit a circuit is made from earth through the contacts H7, AA1 and PQ1, the wiper of the uniselector bank ZZ1, the first bank contact of ZZ1, the operating winding M and the battery BAT$_{20}$ to earth. Thus in the present example where the number of impulses in the first digit is one the wiper on the uniselector bank M1 is set to the first bank contact and hence is connected to the terminal MP$_1$.

The relay BB is slow operating and its contacts BB1 close and open only once for each digit dialled irrespective of the number of impulses in the digit the energising circuit for the winding BB being from earth through the contacts H7 and AA1, the winding BB and the battery BAT$_{25}$ to earth. Thus when the first digit of the wanted number is being dialled the relay contacts BB1 close and remain closed until the dialling impulses for that digit end. The contacts BB$_1$ then open and as a result the wiper of the uniselector bank ZZ1 moves to its second contact.

The dialling impulses of the next digit (4 in this example) are therefore applied to actuate the operating winding of the uniselector C. The wiper of the bank C1 is, therefore, connected through to the terminal CP$_4$. Likewise the dialling impulses of the third and fourth digits dialled (6 and 4 in this example) are applied to actuate the operating windings of the uniselectors D and U respectively and hence the wipers of the banks D1 and U1 are connected through to the terminals DP$_6$ and UP$_4$ respectively.

The pulses M$_1$ to M$_9$ and M$_0$ generated by the low frequency pulse generator 26 of Figure 1 are applied to the terminals MP$_1$ to MP$_9$ and MP$_0$ respectively of Figure 5. Likewise the pulses C$_1$ to C$_9$ and C$_0$ are applied to the terminals CP$_1$ to CP$_9$ and CP$_0$ respectively, the pulses D$_1$ to D$_9$ and D$_0$ are applied to the terminals DP$_1$ to DP$_9$ and DP$_0$ respectively, and the pulses U$_1$ to U$_9$ and U$_0$ are applied to the terminals UP$_1$ to UP$_9$ and UP$_0$ respectively.

Thus the pulses M$_1$, C$_4$, D$_6$ and U$_4$ appear at the wipers of the four uniselector banks M$_1$, C$_1$, D$_1$ and U$_1$ respectively. The rectifier W$_{10}$ normally provides a low impedance in the absence of the C pulses and hence the M$_1$ pulses from the wiper of the bank M$_1$ are dropped across the resistor R201. When a C$_4$ pulse occurs this renders the rectifier W$_{10}$ insulating and allows the part of the M$_1$ pulse occurring during the C$_4$ pulse to pass through the valve V$_{100}$. Thus a pulse corresponding to a C$_4$ pulse appears at the cathode of the valve V$_{100}$ and passes to the control grid of the valve V$_{101}$. In the absence of D pulses the rectifier W$_{11}$ provides a low impedance path for the pulses appearing at the grid of the valve V$_{101}$. When a D$_6$ pulse appears, however, it renders the rectifier W$_{11}$ non-conducting and for the duration of each D$_6$ pulse coincident with a pulse at the grid of the valve V$_{101}$ the grid of the valve and hence its cathode become more positive. The resulting pulse at the cathode of the valve V$_{101}$ likewise passes to the terminal RO only during a coincident U$_4$ pulse from the wiper of the bank U$_1$.

Thus a recurring pulse of 100 micro-seconds duration in channel No. 1464 passes to the calling junction.

This calling pulse is applied to the terminals RT of all the subscriber's line circuits (Figure 2).

The only line circuit to respond to these pulses is, however, only that one to which gating pulses in the low grade channel No. 1464 are applied.

Referring now to Figure 2, and assuming this to be the line circuit of the called subscriber, the calling pulses are applied through the terminal RT and the resistor R$_1$ to the anode of the rectifier W$_2$. As the gating pulses in low grade channel No. 1464 are also applied at SX1464 the rectifier W$_2$ is made non-conducting for the duration of the interval during which the calling pulses applied thereto from the terminal RT occur in channel No. 1464. These calling pulses pass therefore through the resistors $R_1$ and $R_2$ and strike the valve $V_1$. The resulting anode current energises the relay Z and contacts Z1 and Z2 close.

The contacts Z1 complete the energising circuit of the relay L and hence the relay contacts L1 and L2 close. The contacts Z2 earth the contact $BC_2$ of the uniselector bank S5.

The contacts L1 complete a circuit from earth through the home contact and wiper of the uniselector control bank S3, through the contacts L2, K4 and S$dm$, the operating winding and the battery $BAT_2$ to earth. The uniselector S commences to hunt. The earth on the contact $BC_2$ of the bank S5 ensures that the uniselector steps over the OUT contacts on the banks S1, S2 and S3 onto the IN contacts.

Referring to Figure 8 (called unit) when the called unit is free the terminal $PI_2$ is connected through the contacts RB3, the relay winding RQ and the battery $BAT_{28}$ to earth, and hence the terminal $PI_2$ is of negative potential. When, however, the called unit is engaged the contacts $RB_3$ are closed (as will be described later) whereby the terminal $PI_2$ is earthed.

Thus, referring again to Figure 2, the wiper of the bank S3 supplies an earth for the automatic stopping circuit of the uniselector S so long as the wiper is passing over IN contacts connected to engaged called units. When a contact is reached connected to a free called unit, however, the automatic stopping circuit is broken and the motion of the wipers arrested.

The relay K then becomes energised through L1, the earth having been removed from the wiper of S3 and hence from the contacts K4. The contacts K1 and K2 connect the line terminals $LT_1$ and $LT_2$ to the seized called unit.

The contacts K3 close and connect the winding K to the wiper of the bank S3.

The contacts K4 open and hence the moving contact of the contacts K4 is disconnected from the moving contact of the contacts L2 and from the wiper of the bank S5.

The contacts K5 open and extinguish the valve $V_1$ whereby the relay Z becomes de-energised. The contacts Z1 open and de-energise the relay L. The contacts L1 open and remove the direct earth from the relay winding K. The relays Z and L are, however, slow-operating and it is arranged that the earth from the seized called unit is applied to hold the relay K before the contacts L1 open as will be described later. The contacts L2 prepare a homing earth from the bank S4 and the contacts Z2 open and remove the earth from the contact $BC_2$ of the bank S5.

The relay contacts K6 connect the terminal RT to the terminal $BJ_1$ for a purpose to be described later, and the contacts K7 connect the terminal $IJ_1$ through the resistor $RX_1$ and the uniselector bank S6 to the terminal $CIP_1$.

As soon as the relay K operates, and whilst the relays Z and L are opening, the relay RQ of the seized called unit (Figure 8) becomes energised, the energising circuit being from earth through the winding RQ, the contacts $RB_3$, the uniselector bank S3 of Figure 2, the contacts K3 and L1 to earth. Thus, the contacts $RQ_1$ of Figure 8 close and the pulses $d'_0$ and $u'_1$ appear at the terminal $CIP_1$ these pulses serving to identify the high grade channel number of the seized called unit.

These identification pulses pass through the uniselector bank S6 in the subscriber's line circuit and are all dropped across the resistor $RX_1$ with the exception of those which occur during the gating pulses applied in channel No. 1464 to the gating pulse terminal $SX_{1464}$. The gating pulses serve to render the rectifier $WX_1$ non-conducting and hence to permit the identification pulses occurring during channel intervals in channel No. 1464 to pass to the terminal $IJ_1$.

From this terminal the identification pulses pass through the identification junction 25' of Figure 1 to the terminals IJO of all registers. The only identification pulses to pass to the uniselector bank $CUF_2$ (Figure 5) are, however, those which occur (in this example) in channel No. 1464 which are gated by the pulses applied to the rectifier $W_{13}$ from the terminal RO.

These pulses pass from the uniselector bank $CUF_2$ to the terminal R$d'n'$ in the seized calling unit (Figure 3 and Figure 9). Before the arrival of these pulses HT is applied to the translator 25 as contacts B6 will have closed.

Referring to Figure 9, the $d'$ and $u'$ pulses arriving at the terminal R$d'u'$ are applied to the control grids of the valves $V_{32}$ to $V_{51}$ through the resistors $R_{86}$ to $R_{105}$ and pulse lengthening circuits comprising the rectifiers $W_{100}$ to $W_{119}$ and capacitors $C_{103}$ to $C_{122}$. The rectifiers $W_{21}$ to $W_{40}$ are, however, conducting to these pulses except the rectifiers to which $d'$ and $u'$ pulses are applied from the terminals T$u'_0$ to T$d'_9$ simultaneously with the $d'$ and $u'$ pulses arriving at the terminal R$d'u'$. In this example the pulses $d'_0$ and $u'_1$ appear at the terminal R$d'd'$ simultaneously with the pulses $d'_0$ and $u'_1$ applied at the terminals T$d'_0$ and T$u'_1$. Thus the rectifiers $W_{31}$ and $W_{22}$ are non-conducting in this example and permit the $d'_0$ and $u'_1$ pulses applied to the terminal R$d'u'$ to pass to the control grids of the valves $V_{42}$ and $V_{33}$ respectively. These two valves strike and hence their cathodes become positive.

When the wiper of the bank ZRU1 reaches the bank contact connected to the cathode of the valve $V_{33}$ the positive potential appears at the control grid of the valve $V_{28}$ (Figure 3(b)) and this valve strikes. Similarly the valve $V_{29}$ (Figure 3(b)) strikes when the wiper of the bank ZRD1 reaches the bank contact connected to the cathode of the valve $V_{42}$.

Referring to Figure 3(b) when the valves $V_{28}$ and $V_{29}$ strike the relays DA and UA become energised by the anode circuits of these two valves. Thus the contacts DA1, DA2, UA1 and UA2 are operated. The contacts DA1 hold the relay DA and extinguish the valve $V_{28}$ and the contacts DA2 break the automatic stepping circuit of the uniselector ZRU. The contacts UA1 hold the relay UA and extinguish the valve $V_{29}$, and the contacts UA2 break the automatic stepping circuit of the uniselector ZRD.

Thus the wipers of the banks ZRD3 and ZRU3 are arrested on the bank contacts connected to the terminals T$d_0$ and T$u_1$ respectively, the contacts DA3 and UR3 open whereby the HT is removed from the translator. The pulses $d_0$ and $u_1$ are applied to these terminals respectively from the high frequency pulse generator. In the absence of a $d_0$ pulse the rectifier $W_{20}$ is conducting and hence the $u_1$ pulses are dropped across the resistor $R_{40}$. The occurrence of a $d_0$ pulse renders the rectifier $W_{20}$ non-conducting and hence the $u_1$ pulse occurring during each $d_0$ pulse passes to the terminal $G_p$ that is to say, pulses in channel No. 1.

Referring to Figure 3(a) the negative bias applied to the suppressor grids of the two pentodes $V_4$ and $V_5$ is arranged to be sufficient to render these two valves normally non-conducting. The amplitude of the voltage pulses applied to the suppressor grids of the two pentodes $V_4$ and $V_5$ is arranged to be sufficient to render these two valves conducting. Thus the valves $V_4$ and $V_5$ are gated in channel No. 1 and unmodulated pulses in channel No. 1 are transmitted from the anode of $V_4$ through the capacitor $C_5$ to the terminal $GSP_1$.

These pulses pass through the GO speech junction to the terminals GSPO of all called units (Figure 8). The pentode $V_{25}$ is gated in this channel (channel No. 1) and hence unmodulated pulses of anode current flow in the valve $V_{25}$ which is arranged to be normally non-conducting by means of the bias applied thereto from the terminal $-GB_{10}$.

The valve $V_{26}$ having its control grid coupled to the anode of the valve $V_{25}$ also passes pulses of anode current. Thus the relay RB becomes energised, the contacts $RB_3$ put an earth on the terminal $PI_2$ and hence hold the relay K of Figure 2, it being arranged that the contacts RB3 close about ½ second before the contacts L1 of Figure 2 open.

The contacts RB4 close and apply ringing voltage from the transformer XF3 to the called subscriber's station. When the called subscriber answers the relay F becomes energised, the energising circuit being from earth through the battery $BAT_{33}$ the contacts F3, the called subscriber's line, the contacts F2, the relay winding F, the contacts RB4 and the secondary winding of the transformer XF3 back to earth. The contacts RB1 and F1 hold the relay F.

The relay RD then becomes energised, the energising circuit being from earth through the battery $BAT_{30}$, one winding of the relay RD, the contacts F3, the called subscriber's line the contacts F2 and the other winding of the relay RD back to earth.

The contacts RD1 then apply the pulses in channel No. 1 through the valve $V_{31}$ to the terminal $ASP_1$ and thence through the motoring and release junction (19 Figure 1) to the terminal $ASPO_1$ of Figure 3 (calling unit). The rectifier $W_7$ is rendered non-conducting thereby and permits the pulses in channel No. 1 from the terminal GP to appear at the control grid of the valve $V_6$. This valve then passes pulses of anode current through the relay winding D which becomes energised.

The contacts D1 and D2 operate and reverse the polarity of the terminals $+O1$ and $-O1$. This is for signalling purposes as described on page 278 of Telephony vol. II by Atkinson. The contacts D4 apply a pulse of current to the terminal $PO_1$ from the battery $BAT_{10}$, the relay contacts J1 being operated after the contacts D4 on de-energisation of the slow operating relay J by the opening of the contacts D3.

The pulse of current applied to the terminal $PO_1$ operates the motor M of Figure 2 to record the establishment of the call.

The contacts D5 (Figure 3) open and hence remove the earth from the terminal HO. Thus the relay H of Figure 5 becomes de-energised. The contacts H2 open and hence the relay KF is de-energised, and thus the register is released and the uniselector CUF homes.

Speech voltages from the calling subscriber's station are transmitted through the transformer $HY_1$ to the control grid of the valve $V_4$ and there amplitude-modulate the pulses in channel No. 1 applied to the terminal $GSP_1$. These amplitude-modulated pulses pass through the GO speech junction to the called units.

Referring to Figure 8 all pulses from the terminal $GSPO_1$ of the GO speech junction are passed to the control grid of the pentode $V_{25}$ which is gated by channel No. 1 pulses as previously described. Thus only the pulses in channel No. 1 pass to the transformer $XF_2$.

The primary winding is tuned by the capacitor $C_{30}$ to a periodicity of approximately twice the width of the pulses applied thereto from the valve $V_{25}$, and is heavily damped by the resistor $R_{194}$. The winding $S_2XF_2$ has more turns than the winding $S_1XF_2$. The terminal $-GB_{13}$ is arranged to be about five volts less negative than the terminal $-GB_{12}$.

Assuming the charge in the capacitor $C_{31}$ to be such that the potential of the upper plate thereof in the drawing is between that of $-GB_{13}$ and $-GB_{12}$, the rectifiers $W_{16}$ to $W_{19}$ are non-conducting. When a pulse arrives at the primary winding of the transformer $XF_2$ from the valve $V_{25}$ the leading edge of the pulse shock excites the transformer. The first, and negative half-cycle of the free oscillation is applied to the anode of $W_{16}$ which, therefore, remains non-conducting, and to the cathode of $W_{17}$ which becomes conducting and hence $C_{31}$ discharges through $R_{37}$ and $W_{17}$ until the potential of its upper plate in the drawing equals the potential of the terminal $-GB_{12}$. Any further negative excursion at the cathode of $W_{17}$ is damped by $W_{18}$. Simultaneously $W_{19}$ becomes conducting and as a result the capacitor $C_{31}$ discharges further and its upper plate is left at a potential somewhat below that of the terminal $-GB_{12}$.

Just as this negative half-cycle ends, the lagging edge of the pulse arrives and again the transformer $XF_2$ is shock-excited but this time in the opposite sense. The first, and positive, half-cycle of this second free oscillation has no effect on $W_{17}$ and $W_{18}$. The capacitor $C_{31}$ is charged, however, through $W_{16}$ to a value dependent upon the amplitude of the pulse applied to the transformer $XF_2$, and lying between the potentials of the terminals $-GB_{12}$ and $-GB_{13}$.

The damping provided by the resistor $R_{194}$ is arranged to be sufficient to prevent subsequent half-cycles from affecting the charge in the capacitor $C_{31}$.

Thus the capacitor $C_{31}$ presents relatively broad pulses to the valve $V_{27}$ in response to relatively narrow pulses passed by the valve $V_{25}$, the amplitude of the broad pulses being dependent upon the amplitude of the narrow pulses.

The broad amplitude-modulated pulses are demodulated by being passed through the low-pass filter $FIL_2$ and the speech voltages are passed through the transformer $HY_2$, the capacitors $C_{22}$ and $C_{23}$, the contacts F2 and F3, and the called subscriber's line circuit to the called subscriber's line.

Speech voltages from the called subscriber are passed through his line circuit, and the hybrid transformer $HY_2$ to the control grid of the pentode $V_{24}$. Here they serve to amplitude-modulate the pulses (in channel No. 1) applied from the anode of $V_{24}$ to the terminal $RSP_2$. These pulses are applied through the RETURN speech junction to the terminal $RSPO_1$ of Figure 3 and thence to the control grid of the pentode $V_5$ which is gated by pulses in channel No. 1 applied to the suppressor grid from the terminal GP.

The transformer $XF_1$ in the anode circuit of the valve $V_5$, together with the capacitors $C_7$ and $C_{10}$, the resistors $R_7$ and $R_{195}$, and the rectifiers $W_3$ to $W_6$, function in the same manner as the transformer $XF_2$, capacitors $C_{30}$ and $C_{31}$, resistors $R_{37}$ and $R_{194}$, and rectifiers $W_{16}$ to $W_{19}$ of Figure 8, to broaden the pulses passed by the valve $V_5$.

The broadened, amplitude-modulated pulses are passed through the valve $V_3$ and are demodulated by a low-pass filter $FIL_1$. The speech voltages are applied through the transformers $HY_1$ and the calling subscriber's line circuit to the calling subscriber's line.

The operation of the arrangement shown when a called subscriber is already engaged will now be described. When the called subscriber is engaged, the relay K in his line circuit (Figure 2) is already energised and the terminal RT is connected through the relay contacts K6 to the terminal $BJ_1$. Thus the calling pulses arriving at the terminal RT are transmitted to the terminal $BJ_1$ and thence through the Busy junction to the terminal BJO in the register (Figure 5) allotted to the calling subscriber.

Thus these pulses coincide with the calling pulses applied from the terminal RO to the rectifier $W_{14}$ which is rendered non-conducting thereby. Thus the returned calling pulses applied to the terminal BJO pass to the control grid of the valve $V_8$.

The valve $V_8$ is struck and the relay BR is, therefore, energised. The contacts BR1 close and hence earth the terminal $BU_1$. Referring to Figure 3, when the terminal $BU_1$ is earthed the relay G becomes energised. The contacts G1 hold the relay G and the contacts G2 apply the busy tone to the calling subscriber's line through the relay windings A and the calling subscriber's line circuit.

When a call is ended and the calling subscriber replaces his handset on its rest, the energising circuit for the relay A (Figure 3) is broken. The relay contacts A1 return to the position shown thus de-energising the relay B. The contacts B1 remove the earth from the terminal PO₁. Thus the relay K (Figure 2) becomes de-energised, and the uni-selector S homes. The calling unit is released and all relays return to their unoperated condition.

Thus the pulses arriving in channel No. 1 in this example at the terminal GSPO₁ of Figure 8 cease and hence the relay RB becomes de-energised. The contacts RB3 open, and the earth is removed from the terminal PI₂. Thus the relay K in the called subscriber's line circuit is released and the uniselector in ths line circuit homes. The contacts RB1 open and release the relay F (Figure 8) and the called unit is released.

What is claimed is:

1. An automatic telephone exchange comprising a plurality of line terminating units terminating the subscribers' lines respectively connected to the exchange, a plurality of communication links for enabling communication to be established between pairs of said line terminating units, the number of links being substantially less than half the number of line terminating units, routing means connected to all said line terminating units enabling signals to be transmitted to any of said line terminating units, said routing means comprising selector means responsive to the reception at any one of said line terminating units of dialling impulses representative of the number of any other of said line terminating units to transmit a calling signal to said other of the line terminating units, further selector means connected to said line terminating units and responsive to said calling signal to connect said other line terminating unit to one end of a free one of said links, means generating a plurality of signals to identify the said links respectively, further selector means connected to the other ends of said links and to the line terminating units, further routing means connected between all said line terminating units and the last said selector means, and means to transmit from the said other line terminating unit through said further routing apparatus to the last said selector means the one of said identfying signals identifying the link connected to said other line terminating unit to cause the last said selector means to connect the other end of the said free link to the said one of the line terminating units.

2. An automatic exchange as claimed in claim 1, wherein said links are provided by a plurality of time-sharing pulse trains, modulators for modulating the pulses in the pulse trains respectively, and demodulators for demodulating the modulated pulse trains respectively.

3. An automatic exchange as claimed in claim 2, wherein the first said routing means is provided by time-sharing signalling channels.

4. An automatic exchange as claimed in claim 3, wherein said further routing means is provided by time-sharing signalling channels.

5. An automatic telephone exchange comprising a plurality of line terminating units terminating the subscribers' lines respectively connceted to the exchange, a first group of modulator/demodulator units, a second group of modulator/demodulator units, means connecting the modulator/demodulator units in one of the groups to the modulator/demodulator units in the other group, a source of a plurality of pulse trains of different phase, means for applying different ones of said pulse trains to different ones of said modulator/demodulator units in a first of the groups, a register device, means selectively connecting the register device to said line terminating units, said register device comprising means to record dialing impulses received at a first line terminating unit, to select in response thereto a second line terminating unit represented thereby and to transmit a calling signal to the second line terminating unit, said second line terminating unit comprising selector means connected to the modulator/demodulator units in said first group to connect a free one thereof to the second line terminating unit in response to said calling signal, means generating a plurality of signals identifying the modulator-demodulator units respectively in said first group, connections to apply the signal identifying said free one of the modulator/demodulator units in said first group through said selector means to a free one of the modulator/demodulator units in said second group, each of the last said modulator/demodulator units comprising selector means connected to said source of pulse trains and responsive to said identifying signal when applied thereto to select for application to the modulator/demodulator unit associated therewith the same carrier voltage as applied to the modulator/demodulator unit represented by the identifying signal, and means for connecting said free one of the modulator/demodulator units in said second group to said first line terminating unit.

References Cited in the file of this patent

UNITED STATES PATENTS

| | | |
|---|---|---|
| 2,299,479 | Holden | Oct. 20, 1942 |
| 2,541,932 | Melhose | Feb. 13, 1951 |
| 2,584,987 | Deloraine | Feb. 12, 1952 |
| 2,619,548 | Lesti | Nov. 25, 1952 |